United States Patent
Nagel

(10) Patent No.: US 7,152,047 B1
(45) Date of Patent: Dec. 19, 2006

(54) SYSTEM AND METHOD FOR PRODUCTION AND AUTHENTICATION OF ORIGINAL DOCUMENTS

(75) Inventor: Robert H. Nagel, New York, NY (US)

(73) Assignee: eSecure.biz, Inc., New York, NY (US)

(*) Notice: Subject to any disclaimer, the term of this patent is extended or adjusted under 35 U.S.C. 154(b) by 0 days.

(21) Appl. No.: 09/577,533

(22) Filed: May 24, 2000

(51) Int. Cl.
G06F 17/60 (2006.01)

(52) U.S. Cl. .................. 705/76; 705/57; 713/176

(58) Field of Classification Search ........... 235/380, 235/440, 487, 488, 491; 705/76, 57, 67; 380/200, 201, 202, 229; 283/70; 713/200–202, 713/176

See application file for complete search history.

(56) References Cited

U.S. PATENT DOCUMENTS

| | | |
|---|---|---|
| 1,938,543 A | 12/1933 | Sanburn |
| 2,021,141 A | 11/1935 | Boyer |
| 2,208,653 A | 7/1940 | Whitehead |
| 2,379,443 A | 7/1945 | Kantrowitz |
| 3,391,479 A | 7/1968 | Buzzell et al. |
| 3,701,165 A | 10/1972 | Huddleston ............. 2/243 R |
| 3,839,637 A | 10/1974 | Willis .................... 250/302 |
| 3,880,706 A | 4/1975 | Williams ................ 162/103 |
| 3,942,154 A | 3/1976 | Akami et al. ............ 340/146.3 |
| 3,962,539 A | 6/1976 | Ehrsam et al. ........... 178/22 |
| 4,013,894 A * | 3/1977 | Foote et al. ............. 250/569 |
| 4,059,471 A | 11/1977 | Haigh .................... 156/244 |
| 4,121,003 A | 10/1978 | Williams ................ 428/40 |
| 4,150,781 A | 4/1979 | Silverman et al. ....... 235/382 |
| 4,157,784 A | 6/1979 | Grottrup et al. ......... 235/491 |
| 4,178,404 A | 12/1979 | Allen et al. ............. 428/209 |
| 4,186,943 A | 2/1980 | Lee ....................... 283/7 |
| 4,199,615 A | 4/1980 | Wacks et al. ............ 427/431 |
| 4,200,770 A | 4/1980 | Hellman et al. .......... 178/22 |
| 4,247,318 A | 1/1981 | Lee et al. ................ 156/163 |
| 4,405,829 A | 9/1983 | Rivest et al. ............ 178/221 |
| 4,434,010 A | 2/1984 | Ash ....................... 106/291 |
| 4,437,935 A | 3/1984 | Crane ..................... 162/103 |
| 4,445,039 A | 4/1984 | Yew ....................... 250/492 |
| 4,463,250 A | 7/1984 | McNeight et al. ........ 235/385 |
| 4,507,349 A | 3/1985 | Fromson et al. ......... 428/195 |

(Continued)

FOREIGN PATENT DOCUMENTS

EP        20203499 A2    12/1986

(Continued)

OTHER PUBLICATIONS

Rivest, et al; "A Method for Obtaining Digital Signatures . . . ", Communications of ACM 21(2):120-126 (Feb. 1978).

(Continued)

*Primary Examiner*—Elisca Pierre Eddy
(74) *Attorney, Agent, or Firm*—Milde & Hoffberg, LLP

(57) ABSTRACT

A system and method for authenticating documents and content thereof. A counterfeit resistant document recording medium is provided, having thereon a predefined unique document identifier and at least one security feature. The recording medium is thereafter imprinted with document content, which typically varies between documents. The document content is stored in a database, indexed by an associated document identifier. The document may then be authenticated by checking the security feature and comparing the stored document content with a perceived document content. The system provides a number of opportunities for commercial exploitation, including sales of identified recording media, recording of information in a database, on-line authentication transactions, differential accounting for document validations and counterfeit identifications, imprinting devices, AND authentication devices. The system prevents counterfeiting of valuable documents through casual unit by providing both physical and logical security.

18 Claims, 3 Drawing Sheets

U.S. PATENT DOCUMENTS

| | | | |
|---|---|---|---|
| 4,507,744 A | 3/1985 | McFiggans et al. | 364/708 |
| 4,513,056 A | 4/1985 | Vernois et al. | 428/264 |
| 4,514,085 A | 4/1985 | Kaye | 356/71 |
| 4,552,617 A | 11/1985 | Crane | 162/103 |
| 4,623,579 A | 11/1986 | Quon | 428/215 |
| 4,630,201 A | 12/1986 | White | 364/408 |
| 4,637,051 A | 1/1987 | Clark | 382/1 |
| 4,652,015 A | 3/1987 | Crane | 283/91 |
| 4,704,356 A | 11/1987 | Thonar | 435/7 |
| 4,756,557 A | 7/1988 | Kaule et al. | 283/85 |
| 4,767,205 A | 8/1988 | Schwartz et al. | 356/71 |
| 4,779,898 A | 10/1988 | Berning et al. | 283/58 |
| 4,812,965 A | 3/1989 | Taylor | 364/530 |
| 4,814,589 A | 3/1989 | Storch et al. | 235/375 |
| 4,816,655 A | 3/1989 | Musyck et al. | 235/356 |
| 4,820,912 A | 4/1989 | Samyn | 235/449 |
| 4,838,648 A | 6/1989 | Phillips et al. | 350/166 |
| 4,853,961 A | 8/1989 | Pastor | 380/21 |
| 4,864,618 A | 9/1989 | Wright et al. | 380/51 |
| 4,868,877 A | 9/1989 | Fischer | 380/25 |
| 4,879,747 A | 11/1989 | Leighton et al. | 380/23 |
| 4,893,338 A | 1/1990 | Pastor | 380/25 |
| 4,913,858 A | 4/1990 | Miekka et al. | 264/1.3 |
| 4,930,866 A | 6/1990 | Berning et al. | 350/320 |
| 4,972,475 A | 11/1990 | Sant'Anselmo | 380/54 |
| 4,981,370 A | 1/1991 | Dziewit et al. | 380/25 |
| 4,982,437 A | 1/1991 | Loriot | 382/8 |
| 4,995,081 A | 2/1991 | Leighton et al. | 380/23 |
| 5,018,767 A | 5/1991 | Wicker | 283/67 |
| 5,059,245 A | 10/1991 | Phillips et al. | 106/22 |
| 5,073,935 A | 12/1991 | Pastor | 380/30 |
| 5,075,862 A | 12/1991 | Doeberl et al. | 395/117 |
| 5,113,445 A | 5/1992 | Wang | 380/51 |
| 5,118,526 A | 6/1992 | Allen et al. | 427/161 |
| 5,135,812 A | 8/1992 | Phillips et al. | 428/403 |
| 5,142,577 A | 8/1992 | Pastor | 380/21 |
| 5,163,091 A | 11/1992 | Graziano et al. | 380/25 |
| 5,166,978 A | 11/1992 | Quisquater | 380/430 |
| 5,171,363 A | 12/1992 | Phillips et al. | 106/22 R |
| 5,191,613 A | 3/1993 | Graziano et al. | 380/25 |
| 5,193,853 A | 3/1993 | Wicker | 283/85 |
| 5,214,530 A | 5/1993 | Coombs et al. | 359/359 |
| 5,227,617 A | 7/1993 | Christopher et al. | 235/462 |
| 5,231,668 A | 7/1993 | Kravitz | 380/28 |
| 5,243,649 A | 9/1993 | Franson | 380/9 |
| 5,263,085 A | 11/1993 | Shamir | 380/30 |
| 5,283,422 A | 2/1994 | Storch et al. | 235/375 |
| 5,285,382 A | 2/1994 | Muehlberger et al. | 364/401 |
| 5,289,547 A | 2/1994 | Ligas et al. | 382/7 |
| 5,315,112 A | 5/1994 | Harris | 250/235 |
| 5,325,167 A | 6/1994 | Melen | 356/71 |
| 5,337,361 A | 8/1994 | Wang et al. | 380/51 |
| 5,337,362 A | 8/1994 | Gormish et al. | 380/54 |
| 5,351,302 A | 9/1994 | Leighton et al. | 380/30 |
| 5,367,148 A | 11/1994 | Storch et al. | 235/375 |
| 5,367,319 A | 11/1994 | Graham | 347/2 |
| 5,370,763 A | 12/1994 | Curiel | 156/277 |
| 5,375,170 A | 12/1994 | Shamir | 380/30 |
| 5,380,047 A | 1/1995 | Molee et al. | 283/86 |
| 5,384,846 A | 1/1995 | Berson et al. | 380/23 |
| 5,388,158 A | 2/1995 | Berson | 380/23 |
| 5,393,099 A | 2/1995 | D'Amato | 283/91 |
| 5,394,469 A | 2/1995 | Nagel et al. | 380/4 |
| 5,396,559 A | 3/1995 | McGrew | 380/54 |
| 5,410,414 A | 4/1995 | Curry | 358/298 |
| 5,420,924 A | 5/1995 | Berson et al. | 380/23 |
| 5,422,954 A | 6/1995 | Berson | 380/51 |
| 5,426,700 A | 6/1995 | Berson | 380/23 |
| 5,453,605 A | 9/1995 | Hecht et al. | 235/494 |
| 5,464,690 A | 11/1995 | Boswell | 428/334 |
| 5,499,294 A | 3/1996 | Friedman | 380/10 |
| 5,549,953 A | 8/1996 | Li | 428/641 |
| 5,574,790 A | 11/1996 | Liang et al. | 380/23 |
| 5,580,950 A | 12/1996 | Harris et al. | 328/350 |
| 5,591,527 A | 1/1997 | Lu | 428/411 |
| 5,592,549 A | 1/1997 | Nagel et al. | 380/4 |
| 5,592,561 A | 1/1997 | Moore | 382/103 |
| 5,600,725 A | 2/1997 | Rueppel et al. | 380/30 |
| 5,601,683 A | 2/1997 | Martin | 156/277 |
| 5,602,381 A | 2/1997 | Hoshino et al. | 235/493 |
| 5,604,804 A | 2/1997 | Micali | 380/25 |
| 5,606,609 A | 2/1997 | Houser et al. | 380/4 |
| 5,629,980 A | 5/1997 | Stefik et al. | 380/4 |
| 5,634,012 A | 5/1997 | Stefik et al. | 395/239 |
| 5,666,416 A | 9/1997 | Micali | 380/23 |
| 5,677,955 A | 10/1997 | Doggett et al. | 380/24 |
| 5,696,604 A | 12/1997 | Curry | 358/458 |
| 5,706,099 A | 1/1998 | Curry | 358/248 |
| 5,710,636 A | 1/1998 | Curry | 358/248 |
| 5,717,757 A | 2/1998 | Micali | 380/25 |
| 5,745,574 A | 4/1998 | Muftic | 380/23 |
| 5,793,868 A | 8/1998 | Micali | 380/28 |
| 5,815,657 A | 9/1998 | Williams et al. | 395/186 |
| 5,839,119 A | 11/1998 | Krsul et al. | 705/39 |
| 5,857,023 A | 1/1999 | Demers et al. | 380/24 |
| 5,873,604 A * | 2/1999 | Phillips | 283/70 |
| 5,884,277 A | 3/1999 | Khosla | 705/14 |
| 5,903,651 A | 5/1999 | Kocher | 380/25 |
| 5,903,880 A | 5/1999 | Biffar | 705/39 |
| 5,912,974 A | 6/1999 | Holloway et al. | 380/51 |
| 5,913,543 A | 6/1999 | Curiel | 283/94 |
| 5,915,018 A | 6/1999 | Aucsmith | 380/4 |
| 5,915,093 A | 6/1999 | Berlin et al. | 395/200 |
| 5,926,551 A | 7/1999 | Dwork et al. | 380/51 |
| 5,928,471 A | 7/1999 | Howland et al. | 162/110 |
| 5,930,777 A | 7/1999 | Barber | 705/40 |
| 5,932,119 A | 8/1999 | Kaplan et al. | 219/121 |
| 5,933,498 A | 8/1999 | Schneck et al. | 380/4 |
| 5,933,829 A | 8/1999 | Durst et al. | 707/10 |
| 5,937,394 A | 8/1999 | Wong et al. | 705/26 |
| 5,943,422 A | 8/1999 | Van Wie et al. | 380/9 |
| 5,946,103 A | 8/1999 | Curry | 358/405 |
| 5,948,136 A | 9/1999 | Smyers | 71/167 |
| 5,949,042 A | 9/1999 | Dietz et al. | 235/375 |
| 5,949,876 A | 9/1999 | Ginter et al. | 380/4 |
| 5,953,426 A | 9/1999 | Windel et al. | 380/51 |
| 5,960,083 A | 9/1999 | Micali | 380/23 |
| 5,963,924 A | 10/1999 | Williams et al. | 705/40 |
| 5,966,205 A | 10/1999 | Jung et al. | 356/71 |
| 5,974,150 A | 10/1999 | Kaish et al. | 380/25 |
| 5,982,891 A | 11/1999 | Ginter et al. | 380/4 |
| 5,984,366 A | 11/1999 | Priddy | 283/72 |
| 5,987,132 A | 11/1999 | Rowney | 380/24 |
| 5,991,399 A * | 11/1999 | Graunke et al. | 380/4 |
| 5,991,414 A | 11/1999 | Garay et al. | 380/25 |
| 5,995,638 A | 11/1999 | Amidror et al. | 382/100 |
| 5,996,076 A | 11/1999 | Rowney et al. | 713/201 |
| 6,002,772 A | 12/1999 | Saito | 380/49 |
| 6,009,174 A | 12/1999 | Tatebayashi et al. | 380/21 |
| 6,011,905 A | 1/2000 | Huttenlocher | 395/102 |
| 6,014,453 A | 1/2000 | Sonoda et al. | 382/137 |
| 6,016,484 A | 1/2000 | Williams et al. | 705/39 |
| 6,018,724 A | 1/2000 | Arent | 705/44 |
| 6,019,872 A | 2/2000 | Kurrle | 162/140 |
| 6,021,202 A | 2/2000 | Anderson et al. | 380/25 |
| 6,026,167 A | 2/2000 | Aziz | 380/28 |
| 6,028,936 A | 2/2000 | Hillis | 380/23 |
| 6,028,937 A | 2/2000 | Tatebayashi et al. | 380/25 |
| 6,030,655 A | 2/2000 | Hansmire et al. | 427/1 |
| 6,035,402 A | 3/2000 | Vaeth et al. | 713/201 |
| 6,035,914 A | 3/2000 | Ramsey et al. | 156/378 |
| 6,038,016 A | 3/2000 | Jung et al. | 356/71 |
| 6,039,357 A | 3/2000 | Kendrick | 283/93 |
| 6,041,317 A | 3/2000 | Brookner | 705/61 |

| | | | |
|---|---|---|---|
| 6,041,704 A | 3/2000 | Pauschinger | 101/91 |
| 6,044,463 A | 3/2000 | Kanda et al. | 717/168 |
| 6,045,656 A | 4/2000 | Foster et al. | 162/140 |
| 6,049,786 A | 4/2000 | Smorodinsky | 705/40 |
| 6,049,787 A | 4/2000 | Takahashi et al. | 705/44 |
| 6,052,780 A | 4/2000 | Glover | 713/193 |
| 6,054,021 A | 4/2000 | Kurrle et al. | 162/140 |
| 6,058,381 A | 5/2000 | Nelson | 705/40 |
| 6,058,384 A | 5/2000 | Pierce et al. | 705/50 |
| 6,061,448 A | 5/2000 | Smith et al. | 380/21 |
| 6,061,665 A | 5/2000 | Bahreman | 705/40 |
| 6,065,119 A | 5/2000 | Sandford et al. | 713/200 |

FOREIGN PATENT DOCUMENTS

| | | | |
|---|---|---|---|
| EP | 0328320 | | 8/1989 |
| EP | 0388090 A1 | | 9/1990 |
| EP | 0660270 | | 6/1995 |
| GB | 1138011 | | 12/1968 |
| GB | 1489084 A | | 10/1977 |
| GB | 2224240 | | 5/1990 |
| JP | 6141397 | | 5/1994 |
| JP | 06224896 | * | 8/1994 |
| WO | WO9725177 | | 7/1997 |

OTHER PUBLICATIONS

"DSS:Specifications of a Signature Algorithm"; Nat'l Institute of Standards & Technology, Draft, Aug. 1991.

Cox, et al; "Secure Spread Spectrum"...; NEC Research Inst Tech, Report 95-10, 1995.

Rivest, et al; "PayWord and MicroMint..." (May 7, 1996).

"MicroPayment Tranfer Protocol (MPTP)" Version 0.1 (Nov. 22, 1995) et seq, http://www.w3.org/pub/WWW/TR/WD-mptp.

Common Markup for Web Micropayment Systems, http://www.w3.org/TR/WD-Micropayment-Markup (Jun. 9, 1997).

"Distribution IntProp . . . "; Olivia: http://olivia.modlang.denison.edu/~olivia/RFC/09/.

US 6,009,171, 12/1999, Ciacelli (withdrawn)

* cited by examiner

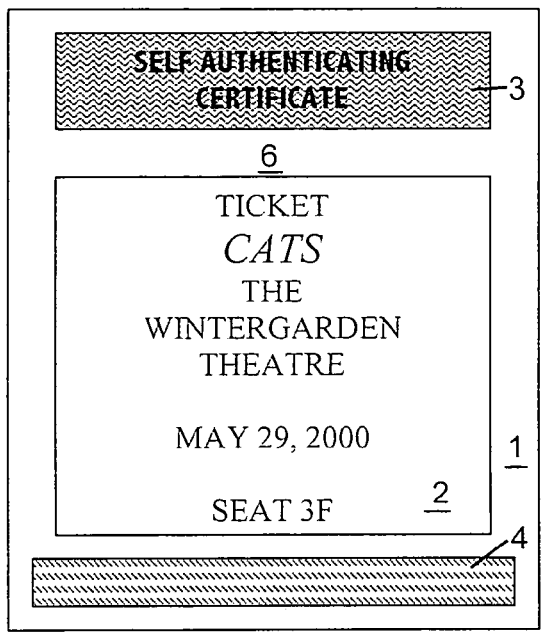
FIG. 1            FIG. 2
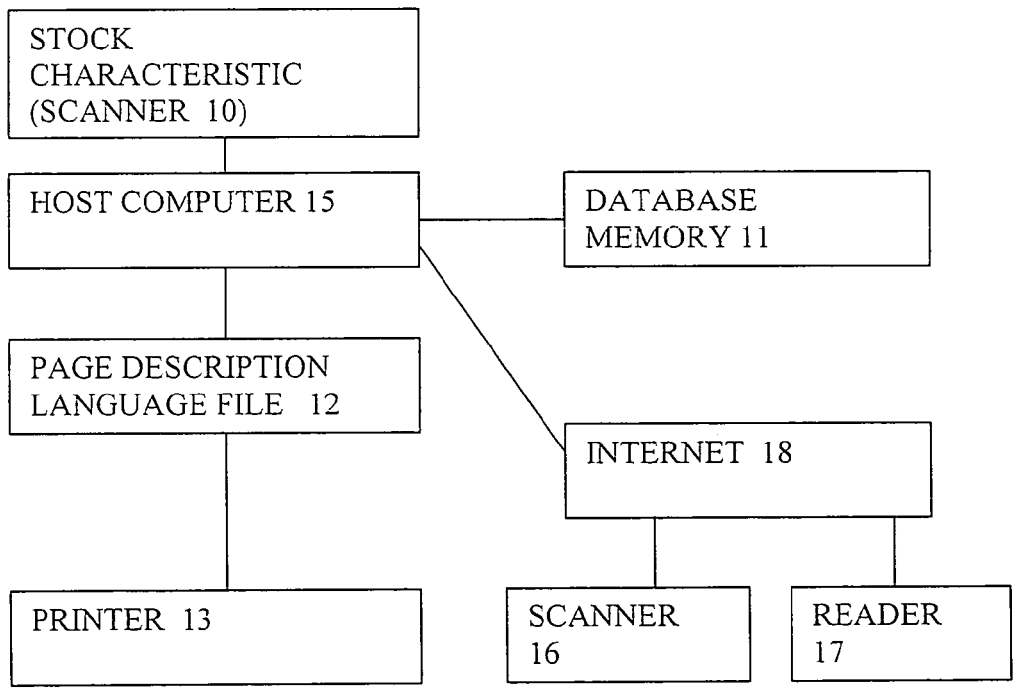
FIG. 3

SYSTEM AND METHOD FOR PRODUCTION AND AUTHENTICATION OF ORIGINAL DOCUMENTS

FIELD OF THE INVENTION

The present invention relates to the field of counterfeit resistant documents, and more particularly to systems and methods employing database techniques to verify authenticity.

BACKGROUND OF THE INVENTION

The problem of counterfeiting is long established. Since it was recognized that a document itself could represent value, a motivation has existed for forgery. Two types of methods evolved for preventing counterfeiting: counterfeit resistant features, such as signatures, special printing, special document recording medium recording stock, magnetic and/or electrical features, and the like; and legal sanctions for an otherwise easy copying process. For example, most cultures provide heavy sanctions for counterfeiting of currency, typically much harsher than private document counterfeiting.

The issues of authentication and counterfeit deterrence can be important in many contexts. Bills of currency, stock and bond certificates, credit cards, passports, bills of lading, as well as many other legal documents (e.g., deeds, wills, etc.) All must be reliably authentic to be useful. Authentication and avoidance of counterfeiting can also be important in many less obvious contexts. For example, improved verification/counterfeiting prevention mechanisms would be very useful in, for example, verifying the contents of shipping containers, quickly identifying individuals with particular health or criminal histories, etc. Counterfeit products are, by definition, unauthorized copies of a product, its packaging, labeling, and/or its logo(s). Attractive targets for counterfeiters are items with significant brand equity or symbolic value, where the cost of production is below the market value.

In the commercial manufacturing world, it is not uncommon for counterfeit or otherwise unauthorized goods to be manufactured, distributed, and sold in direct competition with authentic goods. Counterfeiting has reached epidemic proportions worldwide, especially in the area of consumer goods including goods made from fabric, plastic, leather, metal, or combinations thereof such as clothing, handbags and wallets, perfumes, and other consumer goods. Electronics and software products are also particular targets of counterfeiters, who appropriate the value of trademarks or copyrights without license. Since costs savings based on decreased incremental cost of production (exclusive of license fees) is not a necessary element in the counterfeiting scheme, the counterfeit articles may be of apparently high quality and closely resemble authentic articles. Indeed, counterfeit articles can so closely resemble genuine goods that consumers readily confuse the counterfeit articles with the authentic articles. In other circumstances, the manufacturer segments the world market for different sales and distribution practices, so that the "counterfeit" goods may be essentially identical to authorized goods. Further, in many instances, a manufacturer produces goods under license from an intellectual property owner, and thus sales outside the terms of the license agreement are also "counterfeit".

A wide variety of attempts have been made to limit the likelihood of counterfeiting. For example, some have tried to assure the authenticity of items by putting coded or uncoded markings thereon (e.g., an artist's signature on his or her painting). Unfortunately, as soon as the code is broken—e.g., a counterfeiter learns to duplicate a signature, this method becomes worthless for authentication purposes. In the context of paper products (e.g., currency), counterfeiting-prevention methods have also used two-dimensional authentication mechanisms—e.g., watermarks or special threads incorporated within the paper used to make the currency. These mechanisms are clearly helpful, but they can also be overcome. For example, counterfeiters routinely bleach a one dollar bill (in such a way that the colored threads which mark the special currency paper are not damaged) and then imprint the markings of a one-hundred dollar bill thereon. Thus, the mere release of physical security materials into the market forms one limitation on their unfettered use.

Other authentication methods have utilized mechanisms that provide three dimensions of data. For example, the holograms provided on many credit cards provide more variables (i.e., relative to two-dimensional threads or watermarks) which may be precalibrated, and thereafter, used to verify the authenticity of an item. Nevertheless, since holograms have a pre-set, or deterministic, pattern they may also be duplicated and counterfeit products made. Further, since the holograms are invariant, they are subject to pilferage before application to goods, or translocation from authorized to unauthorized goods in the marketplace. Authentication mechanisms, which utilize deterministic patterns, are inherently vulnerable to counterfeiting since the counterfeiter, in essence, has a "fixed" target to shoot at. High security schemes, such as military codes, have encryption keys that change frequently. This method, however, assists prospectively in securing valuable time-sensitive information, and does not prevent subsequent decryption of a previously transmitted message. At the other end of the spectrum, a random element-based authentication mechanism would provide an incessantly "moving" and nonrepeating target that would be practically impossible to undetectably duplicate, without knowledge of the encoding scheme.

Finally, although existing authentication mechanisms provide adequate protection against counterfeiting in some contexts, increasingly powerful tools are available to decode encrypted messages, making more secure schemes necessary for long-term protection. For example, in conjunction with its monitoring and surveillance activities, governments routinely seek to break or circumvent encryption codes. The technologies employed are then quickly adopted by the private sector, and indeed government regulations seek to maintain weak encryption standards, facilitating code-breaking. In addition to computers, current counterfeiters have access to extremely powerful tools for undermining physical copy-protection schemes—e.g., color photocopying equipment, reverse engineering of semiconductor chips, etc. These factors have combined to continually provoke strong demand for new methods and mechanisms for authenticating items, especially methods and mechanisms that are less vulnerable to counterfeiting and/or employ new copy-protection mechanisms.

More recently, techniques have evolved for authentication of digital information, for example based on cryptological techniques. However, these techniques do not serve to verify the authenticity of a particular copy of the information. In fact, modern digital content protection schemes do seek to prevent digital copying of content; however, these rely on secure hardware for storage of the digital content, and a breach of hardware security measures results in copyable content with no distinction between an original and a copy thereof.

A number of modern systems implement challenge-response authentication, which provide enhanced security for encryption keys and encrypted content. See, for example, U.S. Pat. No. 6,028,937 (Tatebayashi et al.), U.S. Pat. No. 6,026,167 (Aziz), U.S. Pat. No. 6,009,171 (Ciacelli et al.) (Content Scrambling System, or "CSS"), U.S. Pat. No. 5,991,399 (Graunke et al.), U.S. Pat. No. 5,948,136 (Smyers) (IEEE 1394-1995), and U.S. Pat. No. 5,915,018 (Aucsmith), expressly incorporated herein by reference, and Jim Wright and Jeff Robillard (Philsar Semiconductor), "Adding Security to Portable Designs", Portable Design, March 2000, pp. 16–20.

The present invention therefore addresses instances where the issue is not merely whether the information is authentic, but rather whether the information is authentic (and unaltered), and the copy itself an original. Obviously, known techniques may be used to authenticate the content of a document, for example, by providing self-authenticating digital signatures, remote database authentication, trusted intermediary techniques, and the like. Likewise, numerous techniques are available for providing self-authenticating features for the physical medium, for example, security threads, inks, papers and watermarks, printing techniques (e.g., intaglio printing, microlithography), fluorescent inks and/or fibers, steganographic patterns, magnetic and/or electrical/electronic patterns, and the like.

In fact, database techniques are known for authenticating objects associated with documents (labels or certificates), in which the document is both self-authenticating and may further reference a remote database with authentication information for the document or associated object. These techniques, however, are not intended to primarily secure the document itself, and thus the techniques fail to particularly address document content security and authentication, as well as models for commercial exploitation thereof.

It is known that the color of an object can be represented by three values, and that the color may be used for identification and authentication. For example, the color of an object can be represented by red, green and blue values, an intensity value and color difference values, by a CIE value, or by what are known as "tristimulus values" or numerous other orthogonal combinations. For most tristimulus systems, the three values are orthogonal; i.e., any combination of two elements in the set cannot be included in the third element. One such method of quantifying the color of an object is to illuminate an object with broad band "white" light and measure the intensity of the reflected light after it has been passed through narrow band filters. Typically three filters (such as red, green and blue) are used to provide tristimulus light values representative of the color of the surface. Yet another method is to illuminate an object with three monochromatic light sources or narrow band light sources (such as red, green and blue) one at a time and then measure the intensity of the reflected light with a single light sensor. The three measurements are then converted to a tristimulus value representative of the color of the surface. Such color measurement techniques can be utilized to produce equivalent tristimulus values representative of the color of the surface. Generally, it does not matter if a "white" light source is used with a plurality of color sensors (or a continuum in the case of a spectrophotometer), or if a plurality of colored light sources are utilized with a single light sensor.

PRIOR ART

Tamper Evident Certificates

U.S. Pat. Nos. 5,913,543 and 5,370,763 (Curiel), expressly incorporated herein by reference, relates to a tamper evident and counterfeit resisting document, for example a temporary vehicle registration which may be made of paper or paperboard. The document has a zone for inserting information and a pattern within said zone for resisting counterfeiting. A transparent tape which preferably has a silicone resin coating which contains a wax is adhesively secured over information contained within the zone. In other embodiments, an alteration resistant article contains variable data and includes an outer film having an upper surface and a lower surface with an adhesive secured to the lower surface. A hologram for receiving at least a portion of the variable data on the upper surface is secured to the outer film lower surface and, in one embodiment, the hologram has portions which have release properties and portions which have greater adhesive bonding properties than the release containing portions. These respective portions may be established by providing a release material on certain portions of the upper surface of the hologram and providing adhesive enhancing materials on other portions of the hologram upper surface. The hologram may be embossed and have a metallized upper surface. A plurality of relatively small hologram particles may be provided in the outer layer and/or the adhesive layer. The hologram is secured to a substrate which, in one embodiment, has an upper surface printed with pattern means which are printed to a lesser depth than the variable data. In another embodiment, the hologram is provided as a unit with the outer film and overlies the variable data. This system therefore provides physical techniques for document authentication and preventing content alteration.

U.S. Pat. No. 5,601,683 (Martin, Feb. 11, 1997), incorporated herein by reference, provides a photocopy resistant document, having a background pattern or logo which is printed with solvent-sensitive, dye based ink. The presence of this photocopy-resistant background pattern or logo limits copying.

U.S. Pat. No. 5,949,042 (Dietz, II, et al., Sep. 7, 1999), expressly incorporated herein by reference, provides a gaming ticket validation system and method.

Artificial Watermarks

U.S. Pat. No. 5,928,471 (Howland, et al. Jul. 27, 1999), expressly incorporated herein by reference, relates to improved security features for paper, and in particular to a method of making paper and transparentising selected areas of paper to provide enhanced security features. The invention thus provides a method of making paper comprising the step of depositing fibers onto a support surface to form a porous absorbent sheet, applying a transparentising resin to at least portion of said porous sheet and subsequently impregnating the porous sheet with a sizing resin.

The following patents, expressly incorporated herein by reference, provide enhanced security features for use with finished paper and for non-currency and non-security papers. EP-A2-0203499 discloses a method of applying a pseudo watermark to paper. This method comprises the preparation of a paper containing thermally sensitive material, the presence of which renders the translucency of the paper variable by temperature change. When heat is subsequently applied to a part of the surface of the paper, a region of the paper becomes semi-translucent. U.S. Pat. No. 2,021,141 (Boyer, November 1935) discloses a method of applying pseudo watermarks to paper, by applying a resinous composition to finished paper which permeates the paper and causes it to become more transparent, or translucent, than the surrounding area. GB-A-1489084 describes a method of producing a simulated watermark in a sheet of paper. The sheet is impregnated in the desired watermark pattern with a transparentising composition which, when submitted to ultra violet radiation, polymerizes to form a simulated watermark. U.S. Pat. No. 5,118,526 (Allen, et al., Jun. 2, 1992) describes a method of producing simulated watermarks by applying heat, in the desired watermark pattern, onto a thin solid matrix of waxy material placed in contact with a sheet of paper. This results in an impression of a durable translucent watermark. U.S. Pat. No. 4,513,056 (Vernois, et al., Apr. 23, 1985) relates to a process for rendering paper either wholly or partially transparent by impregnation in a special bath of a transparentization resin and subsequent heat cross-linking of the resin. EP-A1-0388090 describes a method of combining a see-through or print-through feature with a region of paper which has a substantially uniform transparency which is more transparent than the majority of the remainder of the sheet. JP 61-41397 discloses a method for making paper transparent and a method for its manufacture for see-through window envelopes. The method utilises the effect of causing ink cross-linked by ultra-violet rays to permeate paper thus causing that part of the paper to become transparent.

Copy Resistant Printing Techniques

U.S. Pat. No. 5,946,103 (Curry, Aug. 31, 1999), expressly incorporated herein by reference, relates to halftone patterns for trusted printing. Predetermined machine and/or human readable information is embedded in at least one serpentine pattern that is printed on each original document, so that any given instance of such a document can be later verified or refuted as being the original by determining whether this information can be recovered from the document or not. The method for verifying the originality of printed documents, said comprises providing at least one trusted printer for printing original documents, embedding predetermined information in each of the original documents in at least one halftone pattern that is composed of halftone cells, each of the cells containing a fill pattern which is symmetric about a central axis of the cell, with the information being represented by the angular orientations of the respective axis of symmetry of at least some of the cells; and classifying the documents as original documents only if said predetermined information can be recovered therefrom. Thus, the technique relies on information which can be readily printed but not readily photocopied.

Self-clocking glyph codes have been developed for embedding machine readable digital data in images of various descriptions. See, for example, Bloomberg et al. (United States patent application, filed May 10, 1994 under Ser. No. 08/240,798) for Self-Clocking Glyph Codes and U.S. Pat. No. 5,453,605 (Hecht et al., Sep. 26, 1995) for Global Addressability for Self-Clocking Glyph Codes. To integrate these glyph codes into line art images, the data typically are embedded in small, similarly sized, spatially formatted, elliptical or slash-like marks or "glyphs" which are slanted to the left or right in generally orthogonal orientations to encode binary zeros ("0's") or ones ("1's"), respectively. Customarily, these glyphs are written on a spatially periodic, two-dimensional lattice of centers at a density that enables up to about 500 bytes of data per square inch to be stored on a document. These glyph codes are well suited for incorporating digital data channels into textual and other types of line art images.

U.S. Pat. No. 5,193,853 (Wicker, Mar. 16, 1993), and U.S. Pat. No. 5,018,767 (Wicker, May 28, 1991), incorporated herein by reference, provide anticounterfeiting methods wherein a marked image has a minute dot or line pitch which varies from normal scanning resolution of typical copying devices, making such mechanical copying detectable.

U.S. Pat. No. 5,315,112, (Tow, May 24, 1994) for Methods and Means for Embedding Machine Readable Digital Data in Halftone Images, describes the use of "circularly asymmetric" halftone dots for incorporating self-clocking glyph codes into halftone images, and defines a workable approach if the data is confined to the midtone regions of the image in accordance with a known or identifiable spatial formatting rule. High sensitivity, however, is required to recover the embedded data with acceptable reliability from the darker or lighter regions of the image.

U.S. Pat. No. 5,706,099, (Curry, Jan. 6, 1998) for Method and Apparatus for Generating Serpentine Halftone Images, expressly incorporated herein by reference, provides circular serpentine halftone cell structures, e.g., Truchet tiles, for embedding data in images. These serpentine halftone cells have a high degree of rotational tone invariance. The arcuate fill patterns may be rotated 45 degrees with respect to the halftone cell boundaries to produce another rotationally distinguishable pair of halftone structures. These structures have been called Manhattans and also are sometimes referred to as ortho-serpentines.

As described in more detail in U.S. Pat. No. 5,696,604, (Curry, Dec. 9, 1997) for Analytic Halftone Dot Construction for a Hyperacuity Printer U.S. Pat. No. 5,410,414 (Curry, Apr. 25, 1995) for Halftoning in a Hyperacuity Printer, and U.S. Pat. No. 5,710,636 (Curry, Jan. 20, 1998) for Method and Apparatus for Generating Halftone Images Having Human Readable Patterns Formed Therein, which are hereby incorporated by reference, halftone patterns may be generated somewhat differently from the traditional way that halftones are generated. The goal is to more precisely control the way the edges of the halftone fill pattern or "shape" evolves as it grows from highlight to shadow. More particularly, in traditional digital halftoning, turning on an appropriate number of bits in a threshold array generates the desired tone. The array holds a sequence of threshold values that may spiral outward from a central location as the threshold values ascend. Bits corresponding to those locations in the halftone cell "turn on" if the incoming data intensity is equal to or greater than the threshold value for that bit location. This method generates halftone dots that grow asymmetrically, as one threshold after another is traversed through a range of intensity values from, say, 0 to 255. For serpentine patterns, however, it is desired to grow the halftone fill pattern at all positions on its perimeter simultaneously to maintain better control of the shape. Therefore, a two step process typically is employed for generating the halftone fill patterns. First, an analytical shape function is defined which grows according to a predetermined evolution from the smallest shape for highlight regions, through midtones, and finally to full coverage of the halftone cell. In this step, shape information is maintained with "infinite precision" with analytic functions. Second, as the area of the shape gets larger, the fill pattern or shape is rendered as if it were a segment of text or line art with a corresponding shape. The result is more control over the shape and the tone evolution of the halftone because they are defined with analytic functions. Nevertheless, it is believed that would be possible to use the traditional thresholding array to generate serpentines given a large enough threshold array.

There are two main goals when analytically defining the shape function. The first is to define functions that can evolve through growth from the smallest shape at intensity value of zero to the largest shape at a value of, say, 255 in a continuous manner. Any jumps in tone caused by discontinuities in the functions will be readily visible in the halftone images. The second goal is ensure that the functions can be solved for the position and angle of the nearest edge of the shape from any point within the halftone cell, at all stages of its evolution with analytic accuracy. This allows the shape, which is defined by a hyperbolic shape function, to be precisely rendered. The strategy used to create a family of curves is to fix the focal point to a suitable value, and then select a x, y value along a halftone cell side, for each family member.

One of the qualities that causes the tone of serpentine halftone patterns to be substantially invariant to rotation is that there is very little change at the boundary between neighboring halftone cells upon 90-degree rotation. This is achieved by selecting the points of intersection for the curve pair defining the fill patterns or shape to be equidistant from the midpoint of the halftone cell side. Two hyperbolic curves are used to define the serpentine shape, and the points at which those curves intersect the periphery of the halftone cell are selected so that these intersections are equally displaced in opposite directions from the midpoint of the cell side. In order to make full use of the analytic precision with which the halftone shape is defined, the rendering of the edges of the shape typically is carried out by modulating the laser of a laser printer with a precision that is finer than the size of the scan spot. For instance, in the time it takes the spot to sweep out its own diameter, up to eight bits of digital information can be provided for modulating it. Likewise, inkjet printers may also produce modulated dot patterns.

The serpentines printed in full color, with the correct color balance and halftone shapes are extremely difficult to reproduce reprographically. The narrow, diagonally extending, unfilled areas in halftone cells representing the darker tones are especially difficult to reproduce faithfully because ordinary copying tends to cause near neighboring shapes to blur together, thereby degrading (if not obliterating) the shape information and clues that aid in determining cell direction. Without these distinguishing features, the image takes on the form of a "waffle" pattern, and is easily recognized as a forgery. Although typical color copiers are excellent at reproducing the correct tones for high quality images, they must supply their own halftone algorithms to do this properly. They usually have their own electronic halftoners embedded in the electronics of the machine, and these haftoners typically are optimized for machine dependent tone reproduction curves and implementationally dependent halftone dot shapes. Accordingly, it is extremely unlikely that an existing halftone that is not a serpentine can reproduce a serpentine halftone. Another possible method of reproducing serpentine images is to scan them in, process the image to determine cell orientation, then reproduce the original data file required to print an "original". This requires access to a printer that can print serpentines, an unlikely prospect for the casual counterfeiter.

Accordingly, serpentines are an excellent candidate for trusted printing applications. For this application, a "trusted printer" (i.e., a printer controlled by a trusted party, such as a service bureau) typically is employed for printing original documents that are designed to include one or more serpentine patterns. Predetermined machine and/or human readable information is embedded in at least one of the serpentine patterns that is printed on each original document, so that any given instance of such a document can be later verified or refuted as being the original instance by attempting to recover this known information from the document in question. This is not an absolute safeguard against counterfeiting, but it is a significant hindrance to those who may attempt to pass off xerographic copies or other conveniently produced copies as original documents.

The feature that gives serpentines a large dynamic range also makes them difficult to copy. As the hyperbolas asymptotically approach the limiting diagonal of the halftone cell, the small region of white is extremely difficult to copy without loss of contrast. The resulting "waffle" appearance of the halftone screen conveniently lacks directionality. This makes serpentines a candidate for image authentication and counterfeit deterrence.

Moiré effects have been used in prior art for the authentication of documents. For example, United Kingdom Pat. No. 1,138,011 (Canadian Bank Note Company) discloses a method which relates to printing on the original document special elements which, when counterfeited by means of halftone reproduction, show a moiré pattern of high contrast. Similar methods are also applied to the prevention of digital photocopying or digital scanning of documents (for example, U.S. Pat. No. 5,018,767 (Wicker), or U.K. Pat. Application No. 2,224,240 A (Kenrick & Jefferson)). In all these cases, the presence of moiré patterns indicates that the document in question is counterfeit. Another known method provides a moiré effect used to make visible an image en coded on the document (as described, for example, in the section "Background" of U.S. Pat. No. 5,396,559 (McGrew, Mar. 7, 1995)), based on the physical presence of that image on the document as a latent image, using the technique known as "phase modulation". In this technique, a uniform line grating or a uniform random screen of dots is printed on the document, but within the pre-defined borders of the latent image on the document the same line grating (or respectively, the same random dot-screen) is printed in a different phase, or possibly in a different orientation. For a layman, the latent image thus printed on the document is hard to distinguish from its background; but when a reference transparency consisting of an identical, but unmodulated, line grating (respectively, random dot-screen) is superposed on the document, thereby generating a moiré effect, the latent image pre-designed on the document becomes clearly visible, since within its pre-defined borders the moiré effect appears in a different phase than in the background.

U.S. Pat. No. 6,039,357 (Kendrick, Mar. 21, 2000), expressly incorporated herein by reference, relates to security bands to prevent counterfeiting with color copies. A protected/security document is provided that foils counterfeiting even if a laser photocopy machine is utilized. The document has at least three discrete half-tone printed bands disposed on its surface, provided by dots or lines. Each printed band has a different screen density and within each bands the dots or lines comprise a warning word or symbol (e.g. "Void"), or a background. The dots or lines of either the "Void" or background drop out when photocopied, while the dots or lines of the other do not. The dots or lines that do not drop out may be dimensioned so that there are about 24–34 per centimeter, while for those that do drop out there are about 52–64 per centimeter. The bands are typically arranged either linearly or in concentric circles, and inter-band areas having density gradually transitioning between the densities of adjacent bands are provided. The total density variation between discrete bands is typically about 10–35%, depending upon ink color, typically about 1.0–10% gradation between adjacent bands. Full tone indicia, which does readily reproduce, is also printed on the substrate.

U.S. Pat. No. 5,995,638 (Amidror, et al., Nov. 30, 1999), incorporated herein by reference, relates to methods and apparatus for authentication of documents by using the intensity profile of moiré patterns, occurring between superposed dot-screens. By using a specially designed basic screen and master screen, where at least the basic screen is comprised in the document, a moiré intensity profile of a chosen shape becomes visible in their superposition, thereby allowing the authentication of the document. If a microlens array is used as a master screen, the document comprising the basic screen may be printed on an opaque reflective support, thereby enabling the visualization of the moiré intensity profile by reflection. Automatic document authentication is supported by an apparatus comprising a master screen, an image acquisition means such as a CCD camera and a comparing processor whose task is to compare the acquired moiré intensity profile with a prestored reference image. Depending on the match, the document handling device connected to the comparing processor accepts or rejects the document. An important advantage is that the process can be incorporated into the standard document printing process, so that it offers high security at the same cost as standard state of the art document production. The system is based on the moiré phenomena which are generated between two or more specially designed dot-screens, at least one of which being printed on the document itself. Each dot-screen consists of a lattice of tiny dots, and is characterized by three parameters: its repetition frequency, its orientation, and its dot shapes. Dot-screens with complex dot shapes may be produced by means of the method disclosed in U.S. patent application Ser. No. 08/410,767 filed Mar. 27, 1995 (Ostromoukhov, Hersch).

U.S. Pat. No. 6,014,453 (Sonoda, et al., Jan. 11, 2000), expressly incorporated herein by reference, relates to a counterfeit detecting method and device to generate counterfeit probability data and apparatus employing same. Counterfeit probability data are generated indicating that a non-reproducible document is being processed even when the pattern which identifies such documents has been defaced. One set of rules and membership functions is stored in each of three memory sets, for each of (1) an unaltered pattern identifying a non-reproducible document, (2) an altered version of that pattern, and (3) a pattern identifying an ordinary reproducible document. A fuzzy inference unit uses these rules and membership functions to generate data representing the probability that a counterfeiting attempt is occurring. These probability data are transmitted to the copy machine through a control CPU to prevent unlawful copying.

Chemical Testing

U.S. Pat. No. 6,030,655 (Hansmire, et al., Feb. 29, 2000), expressly incorporated herein by reference, relates to positive identification and protection of documents using inkless fingerprint methodology. A system is provided for coating a portion of the document with a chemical compound, for determining an image thereupon, including the steps of first providing a document; next, applying a clear chemical coating onto at least a portion of the document; applying an non-visible image onto the chemical coated portion of the document; providing an activator solution; applying the activated solution to the chemically coated portion of the document to reveal the image thereupon; identifying the stamped image for assuring that the stamped image is not a counterfeit or the like.

U.S. Pat. No. 5,289,547 (Ligas, et al., Feb. 22, 1994), incorporated herein by reference, discloses a method for authenticating articles including incorporating into a carrier composition a mixture of at least two photochromic compounds that have different absorption maxima in the activated state and other different properties to form the authenticating display data on the article, subjecting the display data to various steps of the authenticating method, activation of all photochromic compounds, preferential bleaching of less than all of the photochromic compounds, and/or bleaching of all the photochromic compounds, and subsequent examination of the display data following the various activation and bleaching steps by verifying means to enable authentication.

U.S. Pat. No. 4,507,349 (Fromson, et al. Mar. 26, 1985), incorporated herein by reference, provides a currency security system employing synthetic layers and sublimatable dye-formed images on the layers.

Physical Characteristics

U.S. Pat. No. 4,767,205 (Schwartz, et al., Aug. 30, 1988), incorporated herein by reference, discloses an identification method and identification kit based upon making up groups of microsized particles normally visible to the naked eye with each particle in each group being of a selected uniform size, shape and color. Coded identification is established by transferring a population of particles from a selected number of the groups to the item to be identified and then confirming such identification by examining the marked item under high magnification with a light microscope.

Physical Security Schemes—Films and Embedded Filaments

U.S. Pat. No. 4,157,784 (Grottrup, et al., Jun. 12, 1979), incorporated herein by reference, discloses a document security system that optically reveals erasures or modifications of printed matter.

U.S. Pat. No. 3,391,479 (Buzzell et al., July, 1968), incorporated herein by reference, discloses a card security system that provides a dichroic film covering information on the card.

U.S. Pat. No. 3,880,706 (Williams, April, 1975), incorporated herein by reference, discloses a document security system provided by a fused polymer net within a paper pulp substrate.

U.S. Pat. No. 4,247,318 (Lee, et al., Jan. 27, 1981), incorporated herein by reference, provides a security paper formed from non-woven polyethylene film-fibril sheets.

U.S. Pat. No. 4,186,943 (Lee, Feb. 5, 1980), incorporated herein by reference, discloses a banknote or document security system that provides an optically distinctive thin film structure in the body of the banknote or document.

U.S. Pat. No. 4,445,039 (Yew, Apr. 24, 1984), incorporated herein by reference, discloses an encoded document security system having a security element with a readable physical characteristic.

U.S. Pat. No. 4,652,015 (Crane, Mar. 24, 1987), incorporated herein by reference, discloses security paper for banknotes and currency having a metallized film having fine imprinting thereon.

U.S. Pat. No. 4,552,617 (Crane, Nov. 12, 1985), incorporated herein by reference, discloses a document security system provides dissolvable strips of microcarrier material having encoding thereon which persists after the carrier dissolves. U.S. Pat. No. 4,437,935 (Crane, Jr., Mar. 20, 1984), incorporated herein by reference, discloses a document security system provides a dissolvable carrier web material having encoding thereon which attaches to the paper fibers and persists after the web dissolves.

U.S. Pat. No. 5,393,099 (D'Amato, Feb. 28, 1995), incorporated herein by reference, provides an anti-counterfeiting method for currency and the like having embedded micro image security features, such as holograms and diffraction gratings.

Physical Security Schemes—Electromagnetic

U.S. Pat. No. 5,602,381 (Hoshino, et al., Feb. 11, 1997), and U.S. Pat. No. 5,601,931 (Hoshino, et al., Feb. 11, 1997), incorporated herein by reference, relate to system and method for authenticating labels based on a random distribution of magnetic particles within the label and an encrypted code representing the distribution printed on the label, and possibly data imprinted on the label.

U.S. Pat. No. 3,701,165 (Huddlester, October, 1972), incorporated herein by reference, discloses a method of marking garments with a substance detectable by magnetic detecting devices. When the magnetized substance on the garment part is detected in a process of making garments, subsequent garment making steps are actuated in response to the detection of the stitching.

U.S. Pat. No. 4,820,912 (Samyn, Apr. 11, 1989), incorporated herein by reference, provides a method and apparatus utilizing microwaves for authenticating documents, having a random distribution of stainless steel fibers embedded and scattered in a card base member. Microwaves are applied to a large number of metallic wires which are embedded and scattered at random in a document or a card, and a proper digital mark responsive to a response microwave signature is recorded in a suitable region of the document or card according to specific rules. To check the authenticity of the document or card, microwaves are applied to the document or card, and a response microwave signature is collated with the digital mark. The document or card is determined as being authentic when the microwave signature and the mark correspond.

Optical Characteristics and Detection

U.S. Pat. No. 5,325,167 (Melen, Jun. 28, 1994) relates to a record document authentication by microscopic grain structure and method. A record document may be authenticated against reference grain data obtained from the document at a prior time. The body of the document is formed by base medium bearing the record entries such as text within record site. The grain seal site is located at a predetermined location within the base medium. The unique grain structure within the seal site are microscopic and function as a seal for authenticating the document. The seal site is initially scanned to provide a stream of reference data generated by the surface reflection of the grain structure. This reference grain data is stored in memory for future authentication use. The seal site is then currently scanned to generate a stream of current grain data for comparison to the reference grain data.

U.S. Pat. No. 3,942,154 (Akami, et al., Mar. 2, 1976), incorporated herein by reference, discloses a method and apparatus for recognizing colored patterns. The method includes encoding the colors of individual picture elements in a fabric pattern by comparing the level of transmittance or reflectance of the picture element at pre-selected wavelengths with stored values representing a reference color to generate a multibit code indicative of the color of the picture element. A comparator used for this purpose incorporates an error either proportional to the wavelength or of constant value so that the output of the comparator will indicate identity with the stored value if the input value for the picture element is within a certain range of the stored value.

U.S. Pat. No. 4,514,085 (Kaye, Apr. 30, 1985), incorporated herein by reference, provides a method for authenticating documents by marking the document with an encapsulated liquid crystal, and then observing the document under conditions which exploit the unique optical characteristics of liquid crystals.

U.S. Pat. No. 5,591,527 (Lu, Jan. 7, 1997), incorporated herein by reference, provides optical security articles and methods for making same, having layers of varying refractive index forming an image, which is viewable only across a narrow range of viewing angles and is viewable in ambient (diffuse) light, thus affording a readily apparent verification of the authenticity of the substrate.

U.S. Pat. No. 5,580,950 (Harris, et al., Dec. 3, 1996), incorporated herein by reference, provides negative birefringent rigid rod polymer films, formed of a class of soluble polymers having a rigid rod backbone, which when used to cast films, undergo a self-orientation process aligning the polymer backbone parallel to the film surface, resulting in a film that displays negative birefringence.

U.S. Pat. No. 5,549,953 (Li, Aug. 27, 1996), incorporated herein by reference, provides optical recording media having optically variable security properties. Thin film structures, which have an inherent color shift with viewing angle, provide both optically variable security properties and optical data decodable by optical means. The multilayer interference coating has a dielectric material, which is transparent, and a recording layer made of a light absorbing material, a crystalline-structural changing material, or a magneto-optic material. Data is encoded optically or photolithographically as bar codes or digital data.

The use of optically variable pigments has been described in the art for a variety of applications, such as inks for counterfeit-proof applications such as currency, and generically for coating compositions. They are described, for example, in U.S. Pat. No. 4,434,010 (Ash, Feb. 28, 1984), U.S. Pat. No. 4,704,356 (Ash, Feb. 28, 1984), U.S. Pat. No. 4,779,898 (Berning, et al., Oct. 25, 1988), U.S. Pat. No. 4,838,648 (Phillips, et al., Jun. 13, 1989), U.S. Pat. No. 4,930,866 (Berning, et al., Jun. 5, 1990), U.S. Pat. No. 5,059,245 (Phillips, et al., Oct. 22, 1991), U.S. Pat. No. 5,135,812 (Phillips, et al., Aug. 4, 1992), U.S. Pat. No. 5,171,363 (Phillips, et al., Dec. 15, 1992), and U.S. Pat. No. 5,214,530 (Coombs, et al., May 25, 1993), incorporated herein by reference. Pigments of these types are prepared by depositing inorganic transparent dielectric layers, semi-transparent metal layers, and metal reflecting layers onto a flexible web, and separating the layers from the web in such a manner as to fragment the deposited thin film layer structure into pigment particles. These particles are in the form of irregularly shaped flat pigment flakes. These pigments are capable of producing dramatic visual effects, including dichroic effects not observed in other types of pigments. A multilayer thin film interference structure is formed having at least one metal reflecting layer, at least one transparent dielectric layer, and at least one semi-transparent metal layer. Various combinations of these layers can be utilized to achieve the desired optically variable effect. Layer thickness can be varied according to the particular desired characteristics of the pigment. For example, U.S. Pat. No. 5,135,812, incorporated herein by reference, describes useful thickness being on the order of 80 nm for the metal reflecting layer, 5 nm for the semi-opaque metal layers, and thickness of a plurality of halfwaves of the particular design wavelength for the transparent dielectric layers.

U.S. Pat. No. 6,038,016 (Jung, et al., Mar. 14, 2000) and U.S. Pat. No. 5,966,205 (Jung, et al., Oct. 12, 1999), expressly incorporated herein by reference, relate to a method and apparatus for optically detecting and preventing counterfeiting. Perimeter receiver fiber optics are spaced apart from a source fiber optic and receive light from the surface of the object being measured. Light from the perimeter fiber optics pass to a variety of filters. The system utilizes the perimeter receiver fiber optics to determine information regarding the height and angle of the probe with respect to the object being measured. Under processor control, the optical characteristics measurement may be made at a predetermined height and angle. Translucency, fluorescence, gloss and/or surface texture data also may be obtained. Measured data also may be stored and/or organized as part of a data base. Such methods and implements are desirably utilized for purposes of detecting and preventing counterfeiting or the like.

Fluorescent Fibers and Patterns

U.S. Pat. No. 1,938,543 (Sanburn, December, 1933) teaches that detectable fibers which have been specially treated with a chemically sensitive substance can be incorporated into paper and, upon contacting such paper with a second chemical agent, the detectable fibers change color and become distinguishable. As illustrated in U.S. Pat. No. 2,208,653 (Whitehead, July, 1940), authenticatable paper can also be made by including fibers of an organic ester of cellulose that have been treated with a tertiary amine. The treated fibers are invisible in the paper and become fluorescent under ultraviolet light. U.S. Pat. No. 2,379,443 (Kantrowitz et al., July, 1945) discloses authenticatable paper made by the addition of a small percentage of cellulosic fibers that have been treated with hydrated ferric chloride which has been hydrolyzed to iron hydroxide. The treated fibers are capable of acquiring a deep blue color upon application to the paper of a potassium ferrocyanide solution, followed by an orthophosphoric acid solution.

U.S. Pat. No. 3,839,637 (Willis, Oct. 1, 1974), incorporated herein by reference, discloses the impregnation of spaced courses of yarn in a fabric with a material which is not visible under daylight, but which is visible only when subjected to ultra-violet light, so as to provide guide lines for cutting, or measuring indicia to enable visual counting of the number of yards of cloth in a roll from the end thereof without the necessity of unrolling the bolt.

U.S. Pat. No. 4,623,579 (Quon, Nov. 18, 1986), incorporated herein by reference, discloses a decorative composite article, which may be longitudinally slit to form a yarn product, which has a combined phosphorescent and fluorescent decorative appearance. The composite article includes paired outer layers of a thermoplastic resin between which is disposed a decorative layer comprising a composition including a colorant component having a phosphorescent colorant and a fluorescent colorant, and a resin binder material. The fluorescent colorant is present in an amount by weight that is up to an amount equal to that of the phosphorescent colorant. The present binder material may be selected from polyester, polyurethane and acrylic polymers and copolymers, with a mixture of butadiene-acrylonitrile rubber and polyurethane composition being preferred. The composite article is prepared by coating two resin films with the composition, followed by contacting the films with each other on their coated surfaces and applying heat and pressure to bond them together to form the decorative composite article.

U.S. Pat. No. 4,756,557 (Kaule, et al., Jul. 12, 1988), expressly incorporated herein by reference, relates to a security document having a security thread embedded therein and methods for producing and testing the authenticity of the security document. In order to increase the protection of security documents such as ban notes, etc., against forgery, security threads are embedded in the document that have at least two areas extending in the longitudinal direction of the thread and differing in their physical properties. The thread is preferably a coextruded multicomponent synthetic thread whose individual components contain additives such as dyes or fluorescent substances and/or particles having electrical or magnetic properties. The testing of the authenticity of the security thread is directed toward the presence of these additives and their mutual geometrical distribution in certain areas of the security thread.

U.S. Pat. No. 6,019,872 (Kurrle, Feb. 1, 2000), expressly incorporated by reference, relates to authenticatable bleached chemical paper products, prepared from a bleached chemical papermaking furnish containing a minor but detectable amount of lignin containing fibers selected from the group consisting of mechanical, thermomechanical, chemi-thermomechanical and bleached-chemi-thermomechanical, in an amount sufficient to be detectable with the use of a phloroglucinol staining technique.

U.S. Pat. No. 6,054,021 (Kurrle, et al., Apr. 25, 2000), expressly incorporated herein by reference, relates to a process of manufacturing authenticatable paper products, in which the paper made from the papermaking furnish includes fluorescent cellulosic fibers.

U.S. Pat. No. 6,045,656 (Foster, et al., Apr. 4, 2000) relates to a process for making and detecting anti-counterfeit paper. In this process, a certain percentage of wood fiber lumens which have been loaded with one or more fluorescent agents are added to the papermaking pulp. These wood fiber lumens would look normal under regular light, but will glow when exposed to various manners of radiation.

U.S. Pat. No. 6,035,914 (Ramsey, et al., Mar. 14, 2000), expressly incorporated herein by reference, for counterfeit-resistant materials and a method and apparatus for authenticating materials, relates to the use of fluorescent dichroic fibers randomly incorporated within a media to provide an improved method for authentication and counterfeiting protection. The dichroism is provided by an alignment of fluorescent molecules along the length of the fibers. The fluorescent fibers provide an authentication mechanism of varying levels of capability. The authentication signature depends on four parameters; the x, y position, the dichroism and the local environment. The availability of so many non-deterministic variables makes counterfeiting difficult. Essentially, fibers having a readily detectable, non-RGB colorspace characteristic, e.g., fluorescent dichroism, are embedded randomly within a fibrous substrate. Fibers near the surface are readily identified due to their fluorescence. The fibers are then analyzed for dichroism, i.e., having a polarization axis. The positions of these dichroic fibers are useful for authenticating the substrate.

The fibers are distributed throughout the media in a random fashion during the production process. Thus the fiber related signature is a random variable rather than a deterministic one. In fact, it is not believed that any methods presently exist for copying fiber placement within a substrate. The signature of every item will be different making it more difficult to reverse engineer. For example, two-dimensional images (e.g. in the x-y plane) of papers incorporating the inventive fluorescent dichroic fibers provide increased security over the prior art "blue" threads used in currency. A comparison of a white light image and a fluorescence image showing the two-dimensional distribution of florescent dichroic fibers provides unique information. Fibers lying at or near the surface of the paper are easily observed by the white light image but are quickly masked below the surface. In a fluorescence image, fibers that lie below the surface are also readily observable. A comparison of the two images provides a signature. Furthermore, processing of the paper (calendaring) further alters this image comparison. The pressing process reduces the fluorescence from the surface fibers while not perturbing the subsurface fibers thus depth information is available by comparing the two images.

The fluorescent fibers' emission characteristics will also vary depending upon the angular orientation of the fibers within the media relative to a polarized excitation source. For example, at a given wavelength, the intensity of electromagnetic energy emitted by the fibers may vary considerably depending upon whether the fibers within the media are vertically or horizontally oriented relative to the direction of a linearly polarized excitation source and a parallel polarization analyzer. Hence, the dichroic nature of the fibers provides a fourth variable for each point along the fiber (i.e., x, y, z and dichroism/emission behavior).

The emission spectrum of each fluorescent dichroic fiber, can provide data on the fiber's local environment. For example, consider the use of the present invention in paper media or in an aerosol application. The local environment of the fluorescent, dichroic fibers cause photon scattering (e.g., the orientation and number density of the paper fibers) and absorption (e.g., varying thickness of the dried carrier vehicle in an aerosol application). This local environment is indirectly observed through the measurement of the fluorescent dichroic fiber's apparent fluorescent anisotropy. This apparent fluorescent anisotropy assumes random values because the process of incorporating the fibers into the media is a random process.

It is not necessary to analyze each variable for authentication; varying levels of security may be obtained by selecting one or more feature for analysis. For example, at the first level (i.e., the lowest authentication/lowest cost), an item having fluorescent dichroic fibers incorporated therewith may merely be checked to see that the fluorescent fibers are present in the item. The particular fluorescent agent used may be kept secret and dyes which fluoresce in non-visible regions of the electromagnetic spectrum may be employed, so copying this feature may be difficult. At the second level of authentication accuracy, an item having fluorescent, dichroic fibers may be checked to see that the florescent fibers present in the media have the correct fluorescence anisotropy. This level of authentication exceeds that of the first level because the fluorescence anisotropy is dependent upon the molecular structure of the fluorescent molecule and the specific processing conditions used to prepare the fibers containing the fluorescent molecules. The third level of authentication accuracy involves generating a prerecorded x-y pattern of the fluorescent fibers in the item (e.g., by logging the particular random pattern of fibers present in a particular credit card when the card is manufactured). When the item is presented for authentication the observed pattern is compared with the prerecorded pattern. Since each item would have a unique pattern, detection of a counterfeit would simply involve detection of a duplicate or unmatchable pattern. At the highest level of authentication accuracy, the x-y-apparent fluorescent anisotropy pattern of the fluorescent dichroic fibers in the item would be prerecorded. As in the above case, when the item is presented for authentication the observed pattern is compared with the prerecorded pattern. Since the values for the variables in the x-y-apparent fluorescent anisotropy pattern are random, this level of authentication yields an item that is virtually impossible to duplicate. Calculations, using the number density of "blue" and "red" fibers incorporated into currency paper as a base case, indicate that the probability of a random repeat of the x-y-apparent fluorescent anisotropy pattern is about 1 part in $10^{1000}$, an extremely unlikely event.

Cryptographic Techniques

The original forms of cryptography involved the use of a single secret key that was used to both encrypt and decrypt the message (known as symmetric cryptography). One challenge to this technique is the logistics of communicating the secret key to the intended recipient without other parties gaining knowledge of the key. In 1976, Whitfield Diffie and Martin Hellman introduced the concept of Public Key cryptography (asymmetric cryptography). In their system, each person is the owner of a mathematically related pair of keys: a Public Key, intended to be available to anyone who wants it; and a Private Key, which is kept secret and only known by the owner. Because messages are encrypted with a Public Key and can only be decrypted by the related Private Key, the need for the sender and receiver to communicate secret information (as is the case in symmetric cryptography) is eliminated.

Public Key encryption is based on two mathematically related keys that are generated together. Each key in the pair performs the inverse function of the other so what one key encrypts, the other key decrypts, and vice versa. Because each key only encrypts or decrypts in a single direction, Public Key encryption is also known as asymmetric encryption. Encryption and authentication take place without any sharing of Private Keys: each person uses only another's Public Key or their own Private Key. Anyone can send an encrypted message or verify a signed message, but only someone in possession of the correct Private Key can decrypt or sign a message.

The two primary uses of Public Key cryptography, encryption and digital signatures. Encryption messages are encrypted by using the Public Key of the intended recipient. Therefore, in order to encrypt a message, the sender must either have or obtain the Public Key from the intended recipient. The recipient of the message decrypts the message by using their Private Key. Because only the recipient has access to the Private Key (through password protection or physical security), only the recipient can read the message. In order to create a digital signature, the sender's computer performs a calculation that involves both the sender's Private Key and the message. The result of the calculation is a digital signature, which is then included as an attachment to the original message. The recipient of the message performs a similar calculation that includes the message, the digital signature of the sender, and the sender's Public Key. Based on the result of the recipient's calculation, known as a hash, it can be determined whether the signature is authentic (or is fraudulent) and whether the message had been intercepted and/or altered at any point between the sender and the recipient.

In most cryptosystems, with some exceptions, such as elliptic key encryption, the larger the key size, the stronger the encryption. While some people could argue that you can never have too strong a level of encryption, in the world of cryptography the word 'overkill' can certainly be applicable. With stronger encryption comes greater system complexity and longer processing durations to both encrypt and decrypt.

Presently, there are four different 'grades,' that refer to the strength of the protection: Export grade gives minimal real protection (40-bit for symmetric encryption or 512 for asymmetric). Personal grade (56- or 64-bits symmetric, 768 asymmetric) is recommended for keys that are not very important, such as those that protect one person's personal e-mail or those that serve as 'session keys' for low-importance transactions. Commercial grade (128-bit symmetric or 1024 asymmetric) is recommended for information that is valuable and fairly sensitive, such as financial transactions. Military grade (160-bit symmetric or 2048-bit asymmetric) is recommended for information that is truly sensitive and must be kept secret at any cost.

U.S. Pat. No. 5,984,366 (Priddy, Nov. 16, 1999), expressly incorporated herein by reference, relates to unalterable self-verifying articles. Self-verifying article creation includes receiving recipient-specific data, encoding a first selected subset of the recipient-specific data and fixing the encoded subset along with other human-recognizable data on a surface of an article. Self-verifying article authentication includes scanning a surface to locate an encoded first data set, decoding the first data set and comparing the decoded first data set with a control data set, which may also be fixed upon the surface, to determine the authenticity of the received self-verifying article. According to one disclosed embodiment, enhanced data security can be obtained and maintained by verifying a machine-readable data set on an object for acceptability against predetermined criteria which may include searching a data base (e.g., an organized, comprehensive collection of data stored for use by processing system(s)) of previously issued articles to determine uniqueness. The transmission may be by wired or non-wired communication. In order to verify authenticity, an encoded data set (divided in two) on an article to be authenticated is read and processed, locally or remotely, to first check consistency between the divided parts, and to provide biometric authentication information about a presenter or bearer of the object.

U.S. Pat. No. 5,932,119 (Kaplan, et al. Aug. 3, 1999), and WO 97/25177, Shachrai et al., expressly incorporated herein by reference, relate to a laser marking system, with associated techniques for authenticating a marked workpiece. Images of marked objects are stored, and may be authenticated through a database, and/or through a secure certificate of authenticity, including an image of the marked object. According to Kaplan et al., difficult to reproduce characteristics of an object are used as an integrity check for an encoded message associated with the object. These characteristics may be measured or recorded, and stored, for example within a marking on the object, or in a database. Advantageously, these measurements and characteristics may be derived from an image of the object captured in conjunction with the marking process. In fact, by storing such images and providing a pointer to the image, e.g., a serial number, the measurements or characteristics to be compared need not be determined in advance. Therefore, according to such a scheme, the object to be authenticated need only include a pointer to a record of a database containing the data relating to the object to be authenticated. This allows information relating to characteristics of the object, which may be difficult to repeatably determine or somewhat subjective, to be preserved in conjunction with the object. An image of the object on a certificate of authenticity may be used to verify that the object is authentic, while providing a tangible record of the identification of the object. Known secure documents and methods for making secure documents and/or markings are disclosed in U.S. Pat. No. 5,393,099 (D'Amato, Feb. 28, 1995); U.S. Pat. No. 5,380,047 (Molee, et al., Jan. 10, 1995); U.S. Pat. No. 5,370,763 (Curiel, Dec. 6, 1994); U.S. Pat. No. 5,243,641 (U.S. Pat. No. 4,247,318 (Lee, et al., Jan. 27, 1981); U.S. Pat. No. 4,199,615 (Wacks, et al., Apr. 22, 1980); U.S. Pat. No. 4,059,471 (Haigh, Nov. 22, 1977); U.S. Pat. No. 4,178,404 (Allen, et al., Dec. 11, 1979); and U.S. Pat. No. 4,121,003 (Williams, Oct. 17, 1978), expressly incorporated herein by reference. U.S. Pat. No. 5,464,690 (Boswell, Nov. 7, 1995) and U.S. Pat. No. 4,913,858 (Miekka, et al., Apr. 3, 1990), expressly incorporated herein by reference, relate to certificate having holographic security devices.

It is known to provide a number of different types messages for cryptographic authentication. A so-called public key/private key encryption protocol, such as available from RSA, Redwood Calif., may be used to label the workpiece with a "digital signature". See, "A Method for Obtaining Digital Signatures and Public Key Cryptosystems" by R. L. Rivest, A. Shamir and L. Adelmann, Communications of ACM 21(2):120–126(February 1978), expressly incorporated herein by reference. In this case, an encoding party codes the data using an appropriate algorithm, with a so-called private key. To decode the message, one must be in possession of a second code, called a public key because it may be distributed to the public and is associated with the encoding party. Upon use of this public key, the encrypted message is deciphered, and the identity of the encoding party verified. In this scheme, the encoding party need not be informed of the verification procedure. Known variations on this scheme allow private communications between parties or escrowed keys to ensure security of the data except under exceptional authentication procedures. See also, W. Diffie and M. E. Hellman, "New directions in cryptography", IEEE Trans. Information Theory, Vol. IT-22, pp. 644–654, November 1976; R. C. Merkle and M. E. Hellman, "Hiding information and signatures in trapdoor knapsacks", IEEE Trans. Information Theory, Vol. IT-24, pp. 525–530, September 1978; Fiat and Shamir, "How to prove yourself: practical solutions to identification and signature problems", Proc. Crypto 86, pp. 186–194 (August 1986); "DSS: specifications of a digital signature algorithm", National Institute of Standards and Technology, Draft, August 1991; and H. Fell and W. Diffie, "Analysis of a public key approach based on polynomial substitution", Proc. Crypto. (1985), pp. 340–349, expressly incorporated herein by reference. Another encoding scheme uses a DES-type encryption system, which does not allow decoding of the message by the public, but only by authorized persons in possession of the codes. This therefore requires involvement of the encoding party, who decodes the message and assists in authentication.

U.S. Pat. No. 6,028,936 (Hillis, Feb. 22, 2000), U.S. Pat. No. 6,021,202 (Anderson, et al., Feb. 1, 2000), U.S. Pat. No. 6,009,174 (Tatebayashi, et al. Dec. 28, 1999), U.S. Pat. No. 5,375,170 (Shamir, Dec. 20, 1994), U.S. Pat. No. 5,263,085 (Shamir, Nov. 16, 1993), and U.S. Pat. No. 4,405,829 (Rivest, et al., Sep. 20, 1983), incorporated herein by reference, provide encryption and digital signature or document content distribution schemes. U.S. Pat. No. 5,600,725 (Rueppel, et al., Feb. 4, 1997), and U.S. Pat. No. 5,604,804 (Micali, Feb. 18, 1997), incorporated herein by reference, provide public key-private key encryption systems. U.S. Pat. No. 5,166,978 (Quisquater, Nov. 24, 1992), incorporated herein by reference, provides a microcontroller for implementing so-called RSA schemes. U.S. Pat. No. 6,002,772 (Saito, Dec. 14, 1999), expressly incorporated herein by reference, provides An embedded digital watermark scheme.

U.S. Pat. No. 6,065,119 (Sandford, II, et al., May 16, 2000), expressly incorporated herein by reference, provides a method of authenticating digital data such as measurements made for medical, environmental purposes, or forensic purpose, and destined for archival storage or transmission through communications channels in which corruption or modification in part is possible. Authenticated digital data contain data-metric quantities that can be constructed from the digital data by authorized persons having a digital key. To verify retrieved or received digital data, the data-metrics constructed from the retrieved or received data are compared with similar data-metrics calculated for the retrieved or received digital data. The comparison determines the location and measures the amount of modification or corruption in the retrieved or received digital data.

Methods that hide validation information within the data being authenticated offer an alternative means to validate digital data. Digital watermarks can be added to data by methods falling generally into the field of steganography. Steganographic methods are reviewed by W. Bender, D. Gruhl, and N. Morimoto in "Techniques for Data Hiding," Proc. SPIE, Storage and Retrieval for Image and Video Databases III, 9–10 Feb., 1995, San Jose, Calif. This reference also is incorporated herein by reference.

One method of impressing a digital watermark is given by G. Caronni, in "Assuring Ownership Rights for Digital Images," Proc. Reliable IT Systems, VIS '95, 1995, edited by H. H. Bruggemann and W. Gerhardt-Hackl (Vieweg Publ. Co.: Germany). Another method is given by I. J. Cox, J. Kilian, T. Leighton, and T. Shamoon in "Secure Spread Spectrum Watermarking for Multimedia," NEC Research Inst. Tech. Report 95-10, 1995. These references also are incorporated herein by reference.

Unlike the checksum or digital signature that calculate a measure of the original data, digital watermarking techniques modify the data in order to encode a known signature that can be recovered. The presence of the hidden signature in received data verifies that the data are unchanged, or its absence reveals that the data were modified from the watermarked form. The method of Cox et al (1995) supra is designed specifically for digital images, and it is sufficiently robust to survive even transformations of the digital data to analog form. However, all the above methods proposed for digital watermarking generally detect modifications by means of an external signature, i.e., no metric that measures the fidelity of the original digital data is used. Consequently, there exists no ability to measure in any detail the extent of the changes made or to estimate the precision of the received data. The steganographic watermarking methods differ from the digital signature and checksum methods primarily by being invisible, and by using the digital data to convey the watermark, thus eliminating the need for an appended value.

U.S. Pat. No. 5,592,549 (Nagel, et al., Jan. 7, 1997), expressly incorporated herein by reference, relates to a method and apparatus for retrieving selected information from a secure information source. A device is disclosed for retrieving information from a secure electronic information source, wherein at least some of the information is in encrypted form and may be decrypted for use. The device comprises: (a) a computer, having an input device and a display device, for selecting information to be retrieved from the information source; (b) an information retrieval device, coupled to the computer, for retrieving the selected information from the information source; (c) a decryption device, coupled to the computer, for decrypting at least portions of the selected information retrieved from the information source; and (d) a data logging device, coupled to the computer, for maintaining a data log of the selected information as it is retrieved from said information source and decrypted. According to the invention, a unique brand code is automatically, electronically added to at least some of the selected and decrypted information, and to the data log.

U.S. patent application Ser. No. 5,394,469 of Robert Nagel and Thomas H. Lipscomb discloses a personal computer or "host computer" a CD-ROM reader and a "decryption controller". The decryption controller is addressable by the host computer as if it were the CD-ROM reader. Upon receipt of an information request, the decryption controller initiates a request to the CD-ROM reader for the desired information, retrieves this information, decrypts it (if it is encrypted) and then passes it to the host computer. The decryption controller is thus "transparent" to the host computer.

U.S. Pat. No. 6,044,463 (Kanda, et al., Mar. 28, 2000) expressly incorporated herein by reference, relates to a method and system for message delivery utilizing zero knowledge interactive proof protocol. The message delivery system guarantees the authenticity of a user, the reliability of a message delivery, and the authenticity of the message delivery, while preventing an illegal act, and which can prove them at a later time. The system has an information provider terminal including a user authentication unit for carrying out a user authentication of the user according to a zero knowledge interactive proof protocol using check bits E generated according to a work key W, and a transmission unit for transmitting to the user a cipher-text C in which a message M to be delivered to the user is enciphered according to a secret key cryptosystem by using the work key W, and the check bits E. The system also has a user terminal including a message reception unit for taking out the work key W by using at least the check bits E, and obtaining the message M by deciphering the ciphertext C according to the secret key cryptosystem by using the work key W.

U.S. Pat. No. 5,926,551 (Dwork, et al., Jul. 20, 1999) expressly incorporated herein by reference, elates to a system and method for certifying content of hard-copy documents. The system and method facilitate proof that a specific item, such as a document, has been sent via a communication medium, such as the mail service of the United States Postal Service, at a specific time. A bit map image is produced, such as by scanning a hard copy document. Preferably the bit map is compressed into a data string and hashed. The hash file is signed by a certifying authority, such as the USPS, using an existentially unforgeable signature scheme. The original document, a code representation of the string, and a code representation of the signature are sent via the communication medium. As a result, the combination of materials sent provides proof of the authenticity of the content of the document.

U.S. Pat. No. 5,745,574 (Muftic, Apr. 28, 1998), expressly incorporated herein by reference, relates to a security infrastructure for electronic transactions. A plurality of certification authorities connected by an open network are interrelated through an authentication and certification system for providing and managing public key certificates. The certification system with its multiple certification and its policies constitute a public key infrastructure facilitating secure and authentic transactions over an unsecure network. Security services for applications and users in the network are facilitated by a set of common certification functions accessible by well-defined application programming interface which allows applications to be developed independently of the type of underlying hardware platforms used, communication networks and protocols and security technologies.

A digital signature standard (DSS) has been developed that supplies a shorter digital signature than the RSA standard, and that includes the digital signature algorithm (DSA) of U.S. Pat. No. 5,231,668 (Kravitz, Jul. 27, 1993). This development ensued proceeding from the identification and signature of the U.S. Pat. No. 4,995,081 (Leighton, et al., Feb. 19, 1991) proceeding from the key exchange according to U.S. Pat. No. 4,200,770 (Hellman, et al., Apr. 29, 1980) or from the El Gamal method (El Gamal, Taher, "A Public Key Cryptosystem and a Singular Scheme Based on Discrete Logarithms", 1 III Transactions and Information Theory, vol. IT-31, No. 4, July 1985), all of which are expressly incorporated herein by reference.

U.S. Pat. No. 6,041,704 (Pauschinger, Mar. 28, 2000), expressly incorporated herein by reference, relates to a public key infrastructure-based digitally printed postage system. See also, U.S. Pat. No. 6,041,317 (Brookner, Mar. 21, 2000), U.S. Pat. No. 6,058,384 (Pierce, et al., May 2, 2000) and European Patent Application 660 270, expressly incorporated herein by reference, which apply encrypted postage markings to mail. U.S. Pat. No. 5,953,426 (Windel, et al. Sep. 14, 1999), expressly incorporated herein by reference, discloses a private key method for authenticating postage markings. A data authentication code (DAC) is formed from the imprinted postage message, this corresponding to a digital signature. The data encryption standard (DES) algorithm disclosed in U.S. Pat. No. 3,962,539 (Ehrsam et al., June. 1976) is thereby applied, this being described in FIPS PUB 113 (Federal Information Processing Standards Publication).

The data in the deciphered message includes a set of unique or quasi unique characteristics for authentication. In this scheme, the encoding party need not be informed of the verification procedure.

Typical encryption and document encoding schemes that may be incorporated, in whole or in part, in the system and method according to the invention, to produce secure certificates and/or markings, are disclosed in U.S. Pat. No. 5,422,954 (Berson, Jun. 6, 1995); U.S. Pat. No. 5,337,362 (Gormish, et al. Aug. 9, 1994); U.S. Pat. No. 5,166,978 (Quisquater, Nov. 24, 1992); U.S. Pat. No. 5,113,445(Wang, May 12, 1992); U.S. Pat. No. 4,893,338 (Pastor, Jan. 9, 1990); U.S. Pat. No. 4,879,747(Leighton, et al., Nov. 7, 1989); U.S. Pat. No. 4,868,877 (Fischer, Sep. 19, 1989); U.S. Pat. No. 4,853,961(Pastor, Aug. 1, 1989); and U.S. Pat. No. 4,812,965 (Taylor, Mar. 14, 1989), expressly incorporated herein by reference. See also, W. Diffie and M. E. Hellman, "New directions in cryptography", IEEE Trans. Information Theory, Vol. IT-22, pp. 644–654, November 1976; R. C. Merkle and M. E. Hellman, "Hiding information and signatures in trapdoor knapsacks", IEEE Trans. Information Theory, Vol. IT-24, pp. 525–530, September 1978; Fiat and Shamir, "How to prove yourself: practical solutions to identification and signature problems", Proc. Crypto 86, pp. 186–194 (August 1986); "DSS: specifications of a digital signature algorithm", National Institute of Standards and Technology, Draft, August 1991; and H. Fell and W. Diffie, "Analysis of a public key approach based on polynomial substitution", Proc. Crypto. (1985), pp. 340–349, expressly incorporated herein by reference.

In order to provide enduring authentication, it may be desired that multiple codes, containing different information in different schemes, be encoded on the object, so that if the security of one code is breached or threatened to be breached, another, generally more complex code, is available for use in authentication. For example, a primary code may be provided as an alphanumeric string of 14 digits. In addition, a linear bar code may be inscribed with 128–512 symbols. A further 2-D array of points may be inscribed, e.g., as a pattern superimposed on the alphanumeric string by slight modifications of the placement of ablation centers, double ablations, laser power modulation, and other subtle schemes which have potential to encode up to about 1k–4k symbols, or higher, using multi-valued modulation. Each of these increasingly complex codes is, in turn, more difficult to read and decipher.

As is known from U.S. Pat. No. 5,932,119 (Kaplan, et al., Aug. 3, 1999), intrinsic imperfections or perturbations in the marking process may be exploited for authentication. Thus, a pattern may be provided which can be analyzed, but for which techniques for copying are generally unavailable. Thus, a marking pattern, even applied using standard means, may provide an opportunity for counterfeit resistant feature identification.

In like manner, intentional or "pseudorandom" irregularities (seemingly random, but carrying information in a data pattern) may be imposed on the marking, in order to encode additional information on top of a normally defined marking pattern. Such irregularities in the marking process may include intensity modulation, fine changes in marking position, and varying degrees of overlap of marked locations. Without knowledge of the encoding pattern, the positional irregularities will appear as random jitter and the intensity irregularities will appear random. Because a pseudorandom pattern is superimposed on a random noise pattern, it may be desirable to differentially encode the pseudorandom noise with respect to an actual encoding position or intensity of previously formed markings, with forward and/or backward error correcting codes. Thus, by using feedback of the actual marking pattern rather than the theoretical pattern, the amplitude of the pseudorandom signal may be reduced closer to the actual noise amplitude while allowing reliable information retrieval. By reducing the pseudorandom signal levels and modulating the pseudorandom signal on the actual noise, it becomes more difficult to duplicate the markings, and more difficult to detect the code without a priori knowledge of the encoding scheme.

A number of authentication schemes may be simultaneously available. Preferably, different information is encoded by each method, with the more rudimentary information encoded in the less complex encoding schemes. Complex information may include spectrophotometric data, and image information. Thus, based on the presumption that deciphering of more complex codes will generally be required at later time periods, equipment for verifying the information may be made available only as necessary.

Known techniques for using ID numbers and/or encryption techniques to preventing counterfeiting of secure certificates or markings are disclosed in U.S. Pat. No. 5,367,148 (Storch, et al., Nov. 22, 1994); U.S. Pat. No. 5,283,422 (Storch, et al. Feb. 1, 1994); and U.S. Pat. No. 4,814,589 (Storch, et al., Mar. 21, 1989), expressly incorporated herein by reference.

In addition to being analyzed for information content, i.e., the markings, the object image may also be compared with an image stored in a database. Therefore, based on a presumptive identification of an object, an image record in a database is retrieved. The image of the presumptive object is then compared with the stored image, and any differences then analyzed for significance. These differences may be analyzed manually or automatically. Where a serial number or other code appears, this is used to retrieve a database record corresponding to the object that was properly inscribed with the serial number or code. Where the code corresponds to characteristics of the object and markings, more than one record may be retrieved for possible matching with the unauthenticated object. In this case, the information in the database records should unambiguously authenticate or fail to authenticate the object.

U.S. Pat. No. 5,974,150 (Kaish, et al., Oct. 26, 1999), expressly incorporated herein by reference, relates to a system and method for authentication of goods. An authentication system is provided based on use of a medium having a plurality of elements, the elements being distinctive, detectable and disposed in an irregular pattern or having an intrinsic irregularity. Each element is characterized by a determinable attribute distinct from a two-dimensional coordinate representation of simple optical absorption or simple optical reflection intensity. An attribute and position of the plurality of elements, with respect to a positional reference is detected. A processor generates an encrypted message including at least a portion of the attribute and position of the plurality of elements. The encrypted message is recorded in physical association with the medium. The elements are preferably dichroic fibers, and the attribute is preferably a polarization or dichroic axis, which may vary over the length of a fiber. An authentication of the medium based on the encrypted message may be authenticated with a statistical tolerance, based on a vector mapping of the elements of the medium, without requiring a complete image of the medium and elements to be recorded.

U.S. Pat. No. 5,592,561 (Moore, Jan. 7, 1997), incorporated herein by reference, suggests a system that provides an authenticating, tracking/anti-diversion, and anti-counterfeiting system that can track various goods. The system includes a control computer, a host computer, a marking system, and a field reader system, which are all compatible and can be physically linked via data transmission links. An identifiable and unique mark is placed on each good, or on materials out of which the goods are to be made, which enables subsequent inspection. The marks or patterns include areas where a marking agent is applied in an encrypted pattern and areas where it is not applied. The pattern can be scanned or captured by a reader and deciphered into encoded data. The entry can then either be compared directly to a set of authentic entries on a database or decoded and compared to a set of data on the centrally located host database. The marking system provides control over imprinting, allowing a limited number of authorized codes to be printed before reauthorization is required. In order to provide marking validation, a camera captures images of imprints. After imprinting of the encoded marking, an image of the marking is obtained and centrally authenticated as a valid code, which may be stored in a database along with stored pertinent information pertaining to this specific product. Monitoring of the marked goods is facilitated by including a unique encrypted pattern having, for example, a unique owner identifier, a unique manufacturer identifier, a unique plant identifier, a unique destination identifier, and time and date information.

U.S. Pat. No. 5,367,319 (Graham, Nov. 22, 1994), incorporated herein by reference, provides a system wherein an object, such as currency, is randomly marked, such as with an ink jet printer. Counterfeiting of the object by copying is detected by sensing duplication of the random pattern.

U.S. Pat. No. 5,499,924 (Berson, et al., May 30, 1995), incorporated herein by reference, relates to a digital camera with an apparatus for authentication of images produced from an image file. U.S. Pat. No. 5,351,302 (Leighton, et al., Sep. 27, 1994), incorporated herein by reference, relates to a method for authenticating objects based on a public key cryptography method encoding an ascertainable characteristic of the object, such as a serial number.

U.S. Pat. No. 5,574,790 (Liang, et al., Nov. 12, 1996), incorporated herein by reference, provides a multiple-reader system for authentication of articles based on multiple sensed fluorescent discriminating variables, such as wavelengths, amplitudes, and time delays relative to a modulated illuminating light. The fluorescent indicia incorporates spatial distributions such as bar codes as discriminating features, to define a user-determined and programmable encryption of the articles' authentic identity.

U.S. Pat. No. 5,426,700 (Berson, Jun. 20, 1995), incorporated herein by reference, provides a public key/private key system for verification of classes of documents, to verify the information content thereof. U.S. Pat. No. 5,420,924 (Berson, et al. May 30, 1995), and U.S. Pat. No. 5,384,846 (Berson, et al., Jan. 24, 1995), incorporated herein by reference, provide secure identification cards bearing an image of the object to be authenticated. U.S. Pat. No. 5,388,158, incorporated herein by reference, provides a method for making a document secure against tampering or alteration.

U.S. Pat. Nos. 5,191,613, 5,163,091 (Graziano, et al., Nov. 10, 1992), U.S. Pat. No. 5,606,609 (Houser, et al., Feb. 25, 1997), and U.S. Pat. No. 4,981,370 (Dziewit, et al., Jan. 1, 1991), incorporated herein by reference, provide document authentication systems using electronic notary techniques. U.S. Pat. No. 6,049,787 (Takahashi, et al., Apr. 11, 2000), U.S. Pat. No. 5,142,577 (Pastor, Aug. 25, 1992), U.S. Pat. No. 5,073,935 (Pastor, Dec. 17, 1991), and U.S. Pat. No. 4,853,961 (Pastor, Aug. 1, 1989), incorporated herein by reference, provide digital notary schemes for authenticating electronic documents.

U.S. Pat. No. 4,816,655 (Musyck, et al., Mar. 28, 1989), incorporated herein by reference, provides a document authentication scheme which employs a public key-private key scheme and which further employs unscrambled information from the document.

U.S. Pat. No. 4,637,051 (Clark, Jan. 13, 1987), incorporated herein by reference, provides a system for printing encrypted messages which are difficult to forge or alter.

U.S. Pat. No. 4,630,201 (White, Dec. 16, 1986), incorporated herein by reference, provides an electronic transaction verification system that employs random number values to encode transaction data.

U.S. Pat. No. 4,463,250 (McNeight, et al., Jul. 31, 1984), incorporated herein by reference, provides a method for detecting counterfeit codes based on a low density coding scheme and an authentication algorithm.

See also, U.S. Pat. No. 4,150,781 (Silverman, et al., Apr. 24, 1979); U.S. Pat. No. 4,637,051 (Clark, Jan. 13, 1987); U.S. Pat. No. 4,864,618 (Wright, et al., Sep. 5, 1989); U.S. Pat. No. 4,972,475 (Sant' Anselmo, Nov. 20, 1990); U.S. Pat. No. 4,982,437 (Loriot, Jan. 1, 1991); U.S. Pat. No. 5,075,862 (Doeberl, et al., Dec. 24, 1991); U.S. Pat. No. 5,227,617 (Christopher, et al., Jul. 13, 1993); U.S. Pat. No. 5,285,382 (Muehlberger, et al., Feb. 8, 1994); U.S. Pat. No. 5,337,361 (Wang, et al., Aug. 9, 1994); U.S. Pat. No. 5,370,763 (Curiel, Dec. 6, 1994); U.S. Pat. No. 4,199,615 (Wacks, et al., Apr. 22, 1980); U.S. Pat. No. 4,178,404 (Allen, et al., Dec. 11, 1979); U.S. Pat. No. 4,121,003 (Williams, Oct. 17, 1978), U.S. Pat. No. 5,422,954 (Berson, Jun. 6, 1995); U.S. Pat. No. 5,113,445 (Wang, May 12, 1992); U.S. Pat. No. 4,507,744 (McFiggans, et al., Mar. 26, 1985); and EP 0,328,320, incorporated herein by reference.

Thus, there remains a need for a system and method for efficiently authenticating documents as being unaltered originals, while providing high throughput document production. In addition, there remains a need for a method and system for marking documents such that the markings are not readily reproducible with commonly available technologies and so that the markings contain sufficient information for document authentication, identification, and verification. Heretofore, such systems have had various shortcomings.

SUMMARY AND OBJECTS OF THE INVENTION

The present invention therefore relates to a system which provides authentication of originality of a document, by authenticating that the recording medium is authentic, that the document content is unaltered, and that the document content is imprinted on the appropriate unique recording medium.

As noted above, there are numerous known methods for authenticating a unique recording medium. There are also numerous known methods for authenticating a document defined by a digital data set. However, the art has failed to fully address the need for authentication of both the originality of the document content and the recording medium therefore, in a manner suitable for decentralized production of original documents.

According to the present invention, both the production of authenticatable original documents and the authentication thereof may be performed "off-line", meaning that, during the process, no communications tasks need be conducted in real time. Of course, real time communications may be employed.

Initially, it is noted that it is preferred that a first line of authentication derives from visible and readily analyzed features of the recording media, which make forgery thereof difficult. For example, microprinting, Moiré patterns and other printed indicia which are difficult to photocopy without appearing copied, are preferred. Intaglio printing also imposes a difficult hurdle for a forger.

In addition, one or more inks or printing features which provide a "chemical" level of security, may be employed, requiring a forger to obtain proprietary or difficult to obtain components, such as thermal color change inks, iridescent or dichroic particle inks, specific dyes or fluorescent properties, fluorescent and/or dichroic fibers, or the like.

One known method for authentication of the recording medium comprises use of randomly distributed optically detectable fibers included in the papermaking pulp. These fibers may be colored or fluorescent. Typically, it is preferred that a small area of the recording medium having number of fibers be scanned for authentication, rather than the entirety of the stock. However, during production, the entire stock may be scanned, with normal authentication based on a subset of the scanned data.

In this case, the authentication requires two inquiries: do the fibers have locations that correspond to those of the authentic stock? And, are the fibers real or imprinted. The former inquiry can be addressed by a two-dimensional imaging process, while the later must analyze fiber depth within the stock. This depth is, for example, determined by parallax, focal plane, identification of overlying fibers, or special properties. Since the fiber characteristic is non-deterministic (or seemingly so), fiber properties provide a characteristic that existing duplication systems cannot control, the certificate with encoding is very difficult to undetectably duplicate.

One way to optically distinguish printed features from fibers is to employ dichroic fibers, which have an anisotropic interaction with light, producing a measurable light polarization. By detecting this anisotropy, fibers may be distinguished from printed markings.

The document may thereafter be authenticated using an on-line technique, wherein the identifier of the document is employed to retrieve a remotely stored representation of the document, including fiber pattern, for authentication. The returned information may be an image or express description of the pattern of the document captured during the production process, a digital signature (hash) of the pattern, or a description of an authentication method, which may vary randomly, according to a cost schedule, or other pattern. It is noted that the stored image pattern is preferably not transmitted for authentication, both due to its size, and because this provides a forger with the full constellation of characteristics which must be copied to falsely, authenticate the document. Rather, a variable subset of the information is preferred, with an irreversible hash to prevent reconstruction of the source data file. This data, in turn, is preferably transmitted using a secure scheme, although typically the content of the transmission will be available at the authentication station. Hardware security may be provided to limit access to this information, but this level of security may not be warranted in most cases.

The document content, or a digital signature thereof, may be stored remotely, and retrieved based on a unique identification of the document. The required communications may, for example, occur through use of the Internet. See, U.S. Pat. No. 6,052,780 (Glover, Apr. 18, 2000), U.S. Pat. No. 6,011,905 (Huttenlocher, et al. Jan. 4, 2000) and U.S. Pat. No. 5,933,829 (Durst, et al., Aug. 3, 1999), expressly incorporated herein by reference.

The document content may also be authenticate using an on-line digital signature, or may be authenticated using a digital signature or other self-authenticating cryptographic technique, which also confirms the document identity.

In an off-line authentication technique, the authentication information is recorded on the document, and must thus securely identify some irreproducible and essentially unique characteristic aspect of the recording medium, which may be ascertained at the time of authentication. As stated, this characteristic may be a fiber pattern of the paper recording medium, a printed identifier on a document having antiforgery features, or the like.

Typically, in order to provide counterparty identification, the private key of the sender is maintained and employed to sign communications. In fact, such authentication of the authentication authority is typically unnecessary or obtained through other means. For example, the entity seeking authentication proactively contacts the authentication authority, thus making impersonation difficult. Therefore, instead of employing the same private key for each communication, thus risking a security breach in the event of disclosure of the key, the present invention provides a method and system wherein a unique or quasi-unique private key is employed for each authentication message, wherein the encrypted message and public key are either imprinted on the document or transmitted to the authentication site. The public key therefore is used to both decrypt and authenticate the message which, in turn, provides data for authenticating the document.

In an off-line authentication method, preferably the authentication site is provided with a certificate issued by the content owner, which thus provides a cryptographic verification of the authority responsible for the document content.

The recording media itself may thus include features which are difficult to reproduce, such as watermarks, embedded fibers, security threads, holograms, or the like.

Therefore, it is seen that, as a first level of authentication, the authenticity of the recording medium may be examined, generally without any required assistance to the human senses.

While this level of security is often very powerful, it does not address the use of authentic media for forged documents. This concern arises because the recording media according to the present invention may be widely distributed, and further the production facilities cannot generally be made totally secure. Thus, it is desired to have a further level of security to authenticate the medium itself.

A preferred authentication method for the medium provides a cryptographic level of security. In this case, an overt (readily visible) marking is placed on the recording medium, which includes a message. This message may be, for example, a cryptographic message that defines an irreproducible characteristic of the recording medium, such as a microscopic fiber pattern. This message is provided with a digital signature, making alteration thereof difficult. Thus, a relatively simple algorithm is employed to verify that the message imprinted on the recording medium is authentic, and that the message described the actual recording medium. The cryptographic technique is preferably a public key algorithm, wherein the respective public key is known or even imprinted on the document. The public key is then employed to authenticate the message, which in turn is used to authenticate the recording medium. The private key from the originator is maintained as a secret, and since the public key and private key for a pair, the ability of the public key to decrypt the message authenticates the message as deriving from the originator. If the key imprinted on the document is relied upon, then it is preferred that a certification authority be available to verify that the key is authorized, although this may be used statistically rather than for every transaction.

Thus, it is seen that the recording medium may be authenticated with a very high degree of security. This is an important aspect of many embodiments of the invention, as this will assure that the document is an original and not a copy. In cases where copying of the content is of lesser concern, aspects of the security and authentication of the recording medium may be relaxed.

The recording medium, which is preferably a standard size paper, such as 8½×11 inches, is preprinted early in the production process with a unique identifier, which may be a serial number, but is preferably a random identifier. This randomness may be, for example, a combination of a serial number and randomly selected word, facilitating human reading of the identifier. The random component is called a "one time pad". The identifier for this purpose may be the same (or overlapping) with the authentication marking of the recording medium.

In order to provide further security at this stage, the unique identification message may also be included within the authentication scheme for the recording medium.

With the authentication information for the recording medium and unique identifier present, the recording medium may then be publicly distributed. Thus, it is a particular aspect according to an embodiment of the present invention that the authenticatable recording medium need not be held under tight security from the time it is produced until the time it is imprinted with the desired content. In fact, according to this embodiment of the invention, a business model is provided for the distribution and sale of authenticatable medium, for various uses, which can be customized with particular content on a standard-type printer. Thus, original certificates such as birth certificates, wills, licenses, copyright works, and the like may be printed at distributed locations under direct authority of the appropriate authority, with accounting and accountability provided.

In some cases, the rights holder will directly print the documents, in which case the trusted authority may be dispensed with as a party to the printing transaction In order to add the content to the document, the identifier for each piece of recording medium (or the beginning identifier in a sequence) is transmitted to a trusted authority, along with an identifier for the document content to be printed. The trusted authority then either negotiates with the rights holder, or internally accounts for the use, and returns information necessary for printing the document.

The return information is, for example, the document content itself, preferably in graphic form. The content is also digitally signed, with the recording medium identifier, and therefore is self-authenticating.

Thus, the recording medium is authenticated, the content is authenticated, and the content is specific for the recording medium identifier. Alternately, an on-line technique may be used for authentication of the recording medium, content, and/or the merger of the two. Thus, an identifier (preferably not in the form of a sequential serial number) for the recording medium is used to reference a remotely stored file containing the authentication information. On-line authentication potentially increases security, but reduces anonymity of the entity seeking to authenticate the document, often increases transaction cost and may be an inconvenience. Preferably, however, an on-line authentication scheme is available in addition to a self-authentication scheme, possibly defining different authentication information. Further, even when self-authentication is employed, at least a random statistical sampling of the documents being authenticated are authenticated using higher scrutiny, thereby increasing the probability of detection of counterfeiting and the risks thereof. Further, since authentication using cryptographic techniques requires a computing device, it is preferred that authentication information from off-line transactions are later uploaded and analyzed. Even after the fact, the detection of forgery may allow action to be taken to apprehend the forger and/or reduce future risks.

According to the present invention, one embodiment provides a new type of cryptographic technique. For each recording medium, a public key-private key pair is selected. These may be unique for each document. A document serial number and randomly selected passcode (e.g., a randomly selected word or pair of dictionary words) is selected, and imprinted on the document. In conjunction therewith, the public key is printed. Thereafter, during printing of the content, a cipher-text message including the serial number and passcode are downloaded from a central authority, and printed on the document. Thus, the public key printed on the document may then be used to authenticate the cipher-text message. In this case, the private key may be discarded immediately after use for self-authentication schemes, or retained for public key infrastructure communications and authentication of the originator of the message.

Likewise, other techniques may be employed to match the content destined for a particular recording medium with that medium. For example, a graphic pattern may be preprinted on the recording medium during initial production. Thereafter, during printing of the content, a second graphic image may be printed in conjunction, in a form which facilitates unaided human examination. As noted above, copying is limited by a visible set of copy-protection features of the document, as well as the possibility of encoding a unique characteristic of the recording medium. Since cryptographic authentication techniques or digital signatures are employed, it is not possible to substitute recording media without having digital data, which would be revealed during authentication.

Accordingly, both on-line and off-line techniques are employed, with the content printing process particularly being preferably on-line. It is noted that, in some instances, a content printer may "check out" certain recording media, and thus perform the actual printing off-line. This occurs, for example, when the printer is the content owner, and thus the risk of misuse is low. However, it is preferred that all such printing be an interactive on-line process.

Preferably, the technique employs a relatively simple recording medium stock, which may be printed on a relatively standard printer. Security is obtained, therefore, by ascertaining a feature of the stock which is difficult to copy or alter in a desired manner, yet may be readily examined in use. Thus, the problem is asymmetric, with a forger having a significant hurdle, including both physical and algorithmic steps.

Because of the preferred business model for use of the recording medium, in contrast to many prior authenticatable document production systems, neither the customized printing which defines the document content, nor the security of the printer and stock, can be or is mainly relied upon to prevent counterfeiting. Thus, proprietary printers are not required, and the stock may be widely distributed without fear of undermining system security. This therefore allows, for example, standardization and ubiquity of the technology.

Due to an intended low cost, items such as theatre and stadium tickets, coupons, and the like may be readily produced according to this scheme. Because of the high level of security afforded, gift certificates, vouchers, script, currency, valuable documents, securities, negotiable instruments, stock certificates, legal documents, wills, private and business communications and the like, may also be securely printed. In the case of personal identification documents, advantageously, a biometric characteristic of the individual may be printed on the document as document content in plain text or cipher text, or merely logically associated with the document.

Since security is preferably not provided by limiting access level to the uncustomized recording medium, it must be provided at a different level, and indeed, this level is the printing process which uniquely associates the original document content with the recording medium. Therefore, the authentication relies, at least in part, on the security of the central authority which performs (or authorizes and controls) the preprinting process, the code imprinted with the content, and the authorization process, if on-line. In fact, the present techniques allow relatively high security, limited more by internal controls by the central authority than the ability of the third party to crack the cryptographic scheme.

In essence, prior to customized printing, stock is provided having an identifier. During the manufacture of the stock, individual pieces are marked with a unique identifier and a particular characteristic (intrinsic or imparted) of the stock is recorded. For example, a fiber pattern (basic, colored, fluorescent, etc.), which is essentially random, may be recorded. Alternately, a bleed pattern of an ink droplet on a porous surface of the stock, or other intrinsic or applied feature may be used. It is important that the feature not be deterministic; i.e., the process defined for forming the feature is not useful for replicating the feature, and that no known technology could nevertheless be reasonably used to replicate the feature.

Alternately, stock with sufficiently secure anticounterfeit features is preprinted with a digital; signature and an identifier. The preprinted stock is distributed. When a party desires to print an authentic document, he identifies the stock and the document to be printed to a central authority, who then receives an authorization (or accounts for a preauthorization) from the rights holder of the document itself. The central authority then transmits a document definition for the printed page, including a public key-private key encrypted message which a verification of the document identification, a digital signature of the content, and other identification/authentication information. This message is transmitted, for example, through the Internet to an Internet Protocol (IP) address of a printer or print server. The digitally signed document content is then printed on the stock. To authenticate such a document, the stock itself is examined for authenticity. The cryptographic information is then examined, to determine whether the content has been altered, and the identification matches the imprinted identification on the document. Thus, the originality of the document is verified.

Since the content printing is preferably an on-line process, no duplicate prints would be allowed. Saving a document image for duplication, or photocopying would be of no avail, since the cryptographic code includes the unique identifier of the stock. If a forger was to try to preempt the true recording medium by printing a forgery first, then as soon as the true medium appears, a forgery will be identified. In fact, in this case, the "forgery" is in fact an original, and only one original will be allowed. The forgery, in this case, will be accounted as an original. A forgery after the fact (e.g., based on a copying process) would have to overcome the security features of the recording medium to produce an identical medium.

A centralized database therefore holds a descriptor of each piece of stock, associated with its unique identifier. The blank stock is then widely distributed, for use in accordance with the invention. A preferred economic model prices the blank stock as a commodity, although the database remains proprietary and centralized. The stock may also have authentication instructions imprinted thereon. Use of the database may therefore entail a cost, for example to print content or authenticate a document. Since the content printing is preferably an on-line process, while the authentication may be on-line or off-line, preferably the content printing process includes a higher margin than authentication. On the other hand, a differential pricing scheme may be provided for authentic and counterfeit documents. In fact, counterfeits may be charged either more or less than authentic documents. A customer may reasonably pay more for detection of a counterfeit. On the other hand, the central authority may pay a bounty for apprehension of counterfeiters, seeking to assure the integrity of the system.

In use, a user of the system seeking to print a document, defines the desired content, which may involve a monetary accounting to a rights holder, either directly or through an agent. For example, the central authority may serve as agent, collecting funds and authorizing printing of content. Alternately, a rights holder may seek to produce documents on its own account.

Thus, for example, a page description language (PDL) or bitmap image of each page is defined and associated with the stock identifier, including a self-authentication message which includes an identification of the stock. The defined content is then imprinted on the stock preprinted with the identifying information. In the case of multipage documents or multiple originals, a grouping of sheets of stock may be made, for data processing efficiency. Thus, the document content signature may be present, for example, only on the first page.

Where an intrinsic irreproducible feature of the stock is encoded, and the stock is preferably authenticated using the irreproducible feature and identifier, copying of a properly printed document is impossible. Further, possession of stock and an otherwise valid printer is insufficient to undermine the security of the process.

Where the difficulty in reproducing the recording medium is the substantial barrier to copying, care must be taken to assure that the document unique identifier cannot be obliterated or altered, for example using standard techniques. Further, blank document security (prior to preprinting) must be maintained.

In the case of a self-authenticating document, the content in this case is encrypted using a public key-private key technology, or defined with a digital signature, and encoded on the document in conjunction with the irreproducible characteristic of the stock. Authentication is then performed by means of analyzing the code for authenticity, e.g., to verify the originator of the document and the content thereof. In this case, security of the private key is necessary to ensure authenticity, in the manner of a digital signature, for example, using a modification of the method disclosed in U.S. Pat. No. 5,912,974 (Holloway, et al., Jun. 15, 1999), expressly incorporated herein by reference. However, in contrast to the prior art teaching, by encoding the characteristic of the stock, verification of originality is also achieved.

The present technology differs from that described in U.S. Pat. No. 5,932,119 (Kaplan, et al. Aug. 3, 1999), WO 97/25177, Shachrai et al., and U.S. Pat. No. 5,974,150 (Kaish, et al., Oct. 26, 1999) in that authentication of document content is employed. A principal motivation for an embodiment of the present invention is, rather than to authenticate a secondary article, or for the marking to authenticate the substrate itself, to use a marking on the substrate to authenticate a document content imprinted on the substrate as an original.

According to another embodiment of the invention, the document content is imprinted on, or in association with, a piece of secure serialized (or uniquely identified) currency, such as U.S. or foreign nation currency. Therefore, in this case, not only are the intrinsic protections provided therein applicable, but also the legal anti-counterfeiting scheme itself for sanctioning counterfeiters. The serial number of the currency is then used to access a database for authenticating the document content. The currency may be physically associated with the document, for example stapled or placed ion an associated envelope, or the document imprinted on the currency itself (where legally permissible). In the former case, it is possible that a document which is a photocopy of the original is associated with the currency; however, in many instances, such substitution is not objectionable, since only one "original" defined by the serial number of the currency is permissible. It is noted that in the instance of counterfeit currency with duplicated serial numbers, the technique would generally fail, and care should be exercised to avoid non-uniquely identified currency. It is noted that U.S. currency (and other currencies) includes randomly distributed colored fibers, which may themselves be subject to authentication.

In order to detect dichroism, for example of dichroic fibers embedded in a medium, one embodiment of the invention provides for the use of at least two light sources or a time varying light source system, or at least two detectors or a time varying detector system, to illuminate the dichroic fibers, selectively measuring the pattern of the characteristic, which in this case is optical anisotropism.

In some cases, absolute authentication is not required; rather, a significant risk of a counterfeiter being caught is sufficient. Therefore, the technique need not provide 100% detection of all counterfeiting, but rather a significant probability of detection. Thus, for example, pieces of stock may be classified into one of 256 classes by a reliable but secret method. Therefore, less than 0.5% of counterfeits (on otherwise authentic stock) will be able to pass as authentic. To make the problem more difficult, for example, the fibers of an entire document, e.g., 8.5×11 inches, are analyzed and encoded into a class, by each 0.5×0.5 inch portion. During authentication, one or more of the portions are randomly selected for authentication. Thus, while the probability of accidentally authenticating is less than 0.5%, the task of the counterfeiter is to copy the entire pattern, since the relevant region is unknown. This makes the authentication and counterfeiting highly asymmetric.

Advantageously, the serial number and/or other encoding on the stock is imprinted in machine readable form, for example OCR adapted typefaces, magnetic ink coded recording (MICR) toner, bar codes, 2D bar codes, or other known forms. Advantageously, the same sensor for detecting the characteristic of the substrate is used for reading information from the document. For example, a random pattern of magnetic toner particles may define the random characteristic, which may be read with the same sensor as an MICR character reader.

In fact, one aspect of the invention provides a code imprinted on the document using a plurality of coding levels. For example, a serial number is printed on the face of the document, using two to four distinctive fonts. Therefore, each character represents about 5 to 8 bits of data. Preferably, the font coding defines a separate message than the digit coding. Two-dimensional bar codes and glyph codes may also be employed to imprint machine readable authentication information.

The present invention also encompasses an authentication device which may be used to authenticate a document by relatively untrained users, to provide a validation of the document, while maintaining the security of the scheme. Thus, for example, security features may be provided to prevent use of the authentication device to "break" the encoding scheme, which, for example, includes an identification of the features being authenticated.

Therefore, a number of characteristics may be desirable for the authentication device: (1) small size, for example less than 0.05 cubic meter, preferably less than 0.003 cubic meter; (2) low power consumption, for example less than about 10 Watts average, more preferably less than about 0.2 Watt quiescent, 5 Watts peak power draw from a power supply; (3) physical security against disassembly and reverse engineering; (4) electronic security against reverse engineering or code readout; (5) operational security against repeated attempts to verify counterfeit certificates; (6) time-out authorization, requiring periodic reauthorization to remain operational; (7) audit trail capability, to track users and particular usage; (8) adaptive capabilities to compensate for changes over time, such as dirt, defective pixels, wear, etc.; (9) non-predictable authentication schemes, for example selectively analyzing different sub-portions of the certificate in great detail for normal analyses; (10) high security encryption algorithms and optionally support for multiple redundant and independent encryption schemes.

The principal purpose of the authentication device is for cryptographic processing, whereas recording medium authentication may be performed primarily by eye. However, automated recording medium authentication may also be included in this device, especially if it has an optical (or other appropriate) scanner for reading encoded digital information.

The document may be provided with codes having a multiplicity of complexity levels. Thus, even if a first level code is broken, one or more higher complexity codes may then be employed. The advantage of this system over a single level complex code is that the complexity of the detection devices used in the first level may be reduced, and the nature and even existence of the higher level codes need not be revealed until necessary. Further, it is noted that different applications require different security, and therefore it is advantageous to provide a single stock of authenticatable blank medium, which upon use, may be provided with a defined level of security. This, in turn, allows the market to be segmented into classes of users, who may have differing cost sensitivities require different levels of service. Thus, some users may suffice with a 1–10 character password for a self-authenticating encoded document, while others may require maximum security, for example, 2048 bit encryption with remote authentication, and, for example, biometric authentication (e.g., fingerprint) of the bearer of the document.

Preferably, the encoding and authentication processes employ a system that prevents tampering, reverse engineering or massive interrogation, which might lead to a determination of the underlying algorithm and/or the generation of valid codes for counterfeit goods. Alternately, the authenticator may contain no secret information at all, or operate on-line with, for example, a wireless communication link to a central server. Thus, for example, a secure central server may provide authentication services, over secure communications channels. For example, a wireless application protocol (WAP) compliant device may be employed.

When the central server is queried to authenticate a forgery, an entry is made in a log, and further if multiple queries occur in a cluster, the server operates to generate an exception report. The server may also cease responding, alert an operator, or throttle the throughput to prevent rapid brute force attacks. Thus, by providing on-line authentication, enhanced security is provided through monitoring and responding to event context.

Self-authentication may be based on a secure public key algorithm. A security risk exists in that if a common private (secret) encryption key is discovered or released, the usefulness of the encoding on a bulk of document is diminished, and a counterfeiter can generate self-authenticating documents without the knowledge or consent of the normal provider. Until the pool of authentic goods bearing the broken encoding is depleted, or the authentic goods deemed withdrawn, counterfeiters may continue generally undetected. Self-authentication schemes are subject to brute force cracking attempts, since the hacker's activities are not published. Once an authentication code (private key) is discovered, it may be used repeatedly. The present invention therefore provides, even for self-authenticating documents, an optional on-line authentication process using a different code or complexity, which is employed at least randomly to assure a risk of counterfeit detection at a point of presentment.

It is noted that the imprinted code on the certificate need not be visible and/or comprehensible, but rather may itself be a security feature. Thus, special inks, printing technologies, or information storage schemes may be employed. Advantageously, the serial number (or unique identifier) of each document may be provided with security features, and indeed the intrinsic irregularities (e.g., bleed of ink or laser print toner patch edge roughness) on the edges of the serial number imprint themselves providing the non-deterministic characteristic. In this case, like in Kaplan et al., supra, an optical scanner for reading the serial number may simultaneously capture the document irregularity. In a self-authenticating scheme, a code is provided on the document, including a description of the irregularity and a description of the document content, to ensure there has been no alteration. In cases where alteration is not an issue, the document content can be presented as "null", and only the irregularity subject to authentication. This will be the case where the document stock is customized for a purpose, for example certain theatre or stadium tickets, and therefore the mere possession of an authentic document is sufficient.

Alternately, the irregularity scanner may be distinct from the code reader. For example, an imprint may be formed on the document with an ink having reflective or dichroic flecks. The reader, in this case, may be a simple diode laser, with a uniform beam pattern, illuminating the imprint, and capturing the reflection/diffraction pattern thereof. Thus, while alphanumeric codes and other readily visible codes may be read by eye, subtle encoding methods may require specialized equipment for reading. Therefore, another aspect of the invention provides an automated system for reading codes inscribed on a document. The image analysis capability will generally be tuned or adapted for the types of coding employed, reducing the analysis to relevant details of the marking. Where a pseudorandom code appears in the marking pattern, the individual mark locations and their interrelations are analyzed.

According to another embodiment of the invention, a document stock is provided with a substantially irregular color pattern on a microscopic scale, but having a uniform average background reflection. Therefore, attempts to copy the document will require that the background be subtracted, and the forgery placed on a clean piece of similar stock. This provides the opportunity to steganographically hide pseudorandom image information in the image microstructure of the document, using techniques which are essentially invisible. For example, if the stock includes a relatively high density of light colored cellulose fibers, a sparse pattern of dots could be printed on the stock using the same dye. Therefore, it would be difficult or impossible to analyze every color portion of the document to distinguish fibers from printed dots; however, the document could be authenticated by knowing the imposed locations of the dots. Simple photocopying of the document with the fiber and dot pattern would be ineffective since visually, the gross appearance would be different from an authentic document. This has the advantages that the stock need not be scanned during manufacture to determine the pattern, that a simple mask or set of masks (e.g., dots and voids) could be used for authentication, and that the stock precustomization may be distributed and decentralized. Advantageously, an optical mask is formed using a transmissive liquid crystal light shutter overlayed on the document. In this manner, a first mask defines dot locations, a second mask defines locations which should have no dots (but may have fibers), a third mask defines a printed document content, and a fourth mask defines locations which should have no content, all of which may be visually confirmed. Thus, for authentication, the document code is used to call up an associated database record, or the self-authentication codes read. This defines the four masks, which are applied sequentially to the light shutter.

According to a preferred embodiment, the pattern on the document is represented as an image projected on a surface, with the surface not necessary being constrained to be planar. Therefore, relative deformations of the authentication pattern may be resolved through mathematical analysis using known transform and image normalization techniques, such as Fourier, wavelet, etc. transforms. The relative deformations, as well as any other deviations from the encoded patterns, which may, for example, represent lost or obscured markings or fibers, noise, environmental contamination with interfering substances, errors or interference in the original encoding process, etc., are then used to determine a likelihood that the document itself corresponds to the originally encoded certificate. Thus, the determined authenticity is preferably associated with a reliability thereof, based on stochastic variations in the properties of the document and stochastic variations in the generation of the associated secure code. A threshold may then be applied to define an acceptable error rate (false positive and false negative) in the authentication process. In general, for valuable paper documents, a threshold may be set relatively high, while for low value documents the authentication threshold may be significantly lower.

According to one embodiment of the invention, the stock precustomization system therefore includes a reader, for reading the unique characteristics of the stock, such as a polarization sensitive imaging device for reading a distribution of dichroic fibers embedded in paper, and a stock imprinter, e.g., for imprinting a substantially unique identifier and optionally a message, on the stock. A description or signature of the read information is stored in a database in association with the identification applied to the stock. During customization, which is typically an on-line process, the content is defined. The content, a description or signature thereof, may be stored in conjunction with the identifier, in the central database.

In some instances, it may be desired to maintain the document content secret from a remote authentication source (central database). In this case, the document content may be encrypted, or only a document digital signature with substantial information loss, but still a high probability of detection of tampering, provided. Further, a three-party transaction, involving the content owner, database registrar, and content user, may occur, in which the database registrar does receive the content nor maintain the authentication data for the document.

During customization, the identification of the stock and the identification of document content (or the content itself) is transmitted to the central server hosting the database, and the document content stored in association with the identification. For self-authentication, this information is then encrypted using an algorithm, to produce an encrypted message, which is then printed in the document stock, using a standard type printer, possibly along with authentication instructions. The encryption may be a multitier system, for example including a 56-bit algorithm, a 128 bit elliptic algorithm, and a 1024 bit algorithm. Each message level is preferably printed separately on the stock, for example, the 56 bit encrypted message as a binary or bar code, and the 128 bit elliptic and 1024 bit encrypted message as a set of two-dimensional matrix codes. Alternately, the higher level messages may be encrypted by the lower level algorithms, providing a consolidated multiple encryption system. Preferably, each encrypted message corresponds to successively more detailed information about the label and/or the object, optionally with redundant encoding or potentially without any overlap of encoded information. This system allows readers to be placed in the field to be successively replaced or upgraded over time with readers that decode the more complex codes. By limiting use of the more complex codes, and release of corresponding code readers, until needed, the risk of premature breaking these codes is reduced. In addition, the use of codes of varying complexity allows international use even where export or use restrictions are in place of the reader devices.

According to a preferred embodiment, a customized print driver or printer firmware is provided to automate the communication, which is preferably through a TCP/IP stack, through the Internet using secure socket layer communications (SSL), through a VPN, or through a private network (intranet).

A modified paper tray (or paper tray accessory) in a printer may be used to automatically read the stock serial number, which in this case is advantageously a bar code disposed perpendicular to a paper path of the stock. Alternately, a stated identification of a set (e.g., ream) or sequential stock may be identified, with automated incrementing of the sequence. Thus, with few modifications, standard printers and computer software may be employed. Possibly more importantly, standard applications and generally standard operating systems may be employed. The process may therefore be embedded, in whole or in part, in the printer hardware. If the process is embedded in the hardware, the content identification must be transmitted to the printer from an application or interface, so that the printer may communicate with the central server to retrieve the authentication information and provide accounting information.

If the self-authentication reader includes secret information, it preferably has a secure memory for storing specifics of the algorithm(s), which is lost in event of physical tampering with the devices. Further, the devices preferably have a failsafe mode that erases the algorithm(s) in case of significant unrecoverable errors. Finally, the systems preferably include safeguards against trivial marking or continuous interrogation, while allowing high throughput or checking of documents. Since the algorithm memory within the reader may be fragile, a central database or server may be provided to reprogram the unit in case of data loss, after the cause of loss is investigated. Any such transmission is preferably over secure channels, for example 128-bit encryption or so-called secure socket layer (SSL) through a TCP/IP communication protocol. Each reader system preferably has a unique identification number and set of encryption keys for any communication with the central system.

The present invention provides a particular economic opportunity for an administrar of an authentication database. The administrar serves as a trusted third party, allowing production of original and authenticatable documents while accounting to the originator thereof, and authentication of documents without direct communications between the originator of the document and the recipient. The administrar, in turn, has the ministerial functions of maintaining security of the database and integrity of the system, and responding promptly to document creation and on-line authentication requests. For these services, the administrar may charge for the document stock, e.g., per document or page print, based on a value represented by the document, for authentication services, selectively and differentially based on an authentication outcome, a flat rate over time for maintenance of authentication files, or according to other economic recovery theories.

In general, the payments will often be considered micropayments, e.g., those in which the transactional expense is low and of a similar magnitude to the value of the services, e.g., less than about $1.00. When aggregated, traditional payment schemes may be appropriate; however, when individually accounted, micropayment technology is preferably employed. Micropayment technology may also provide a degree of anonymity, whereas traditional electronic funds transfer generally requires tracability of funds and identification of accounts.

It is noted that the methods according to the present invention may also be employed as a digital content management system, in which case compensation may be provided to the originator of the document content for usage thereof, with a central consolidated accounting scheme. See, for example, U.S. Pat. No. 5,991,414 (Garay, et al., Nov. 23, 1999), U.S. Pat. No. 5,949,876 (Ginter, et al., Sep. 7, 1999), U.S. Pat. No. 5,982,891 (Ginter, et al., Nov. 9, 1999), U.S. Pat. No. 5,943,422 (Van Wie, et al., Aug. 24, 1999), U.S. Pat. No. 5,933,498 (Schneck, et al., Aug. 3, 1999), U.S. Pat. No. 5,629,980 (Stefik, et al., May 13, 1997) and U.S. Pat. No. 5,634,012 (Stefik, et al., May 27, 1997), expressly incorporated herein by reference.

Micropayments are often preferred where the amount of the transaction does not justify the costs of complete financial security, and some degree of anonymity is desired. The transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of a non-real time transactions of small monetary units are substantially less than those of secure, unlimited or potentially high value, real time verified transactions.

Thus, a rights management system embodiment according to the present invention may employ an applet, local to the client system, which communicates with other applets and/or the server and/or a vendor/rights-holder to validate a transaction, at low transactional costs.

It is noted that the security for the economic payment for a document need not of the same level as the security for authentication of the resulting document.

The following U.S. patents, expressly incorporated herein by reference, define aspects of micropayment, digital certificate, and on-line payment systems: U.S. Pat. No. 5,930,777 (Barber); U.S. Pat. No. 5,857,023 (Demers et al.); U.S. Pat. No. 5,815,657 (Williams); U.S. Pat. No. 5,793,868 (Micali); U.S. Pat. No. 5,717,757 (Micali); U.S. Pat. No. 5,666,416 (Micali); U.S. Pat. No. 5,677,955 (Doggett et al.); U.S. Pat. No. 5,839,119 (Krsul; et al.); U.S. Pat. No. 5,915,093 (Berlin et al.); U.S. Pat. No. 5,937,394 (Wong, et al.); U.S. Pat. No. 5,933,498 (Schneck et al.); U.S. Pat. No. 5,903,880 (Biffar); U.S. Pat. No. 5,903,651 (Kocher); U.S. Pat. No. 5,884,277 (Khosla); U.S. Pat. No. 5,960,083 (Micali); U.S. Pat. No. 5,963,924 (Williams et al.); U.S. Pat. No. 5,996,076 (Rowney et al.); U.S. Pat. No. 6,016,484 (Williams et al.); U.S. Pat. No. 6,018,724 (Arent); U.S. Pat. No. 6,021,202 (Anderson et al.); U.S. Pat. No. 6,035,402 (Vaeth et al.); U.S. Pat. No. 6,049,786 (Smorodinsky); U.S. Pat. No. 6,049,787 (Takahashi, et al.); U.S. Pat. No. 6,058,381 (Nelson); U.S. Pat. No. 6,061,448 (Smith, et al.); U.S. Pat. No. 5,987,132 (Rowney); and U.S. Pat. No. 6,061,665 (Bahreman). See also, Rivest and Shamir, "PayWord and MicroMint: Two Simple Micropayment Schemes" (May 7, 1996), expressly incorporated herein by reference; Micro PAYMENT transfer Protocol (MPTP) Version 0.1 (22 Nov. 1995) et seq, http://www.w3.org/pub/WWW/TR/WD-mptp; Common Markup for web Micropayment Systems, http://www.w3.org/TR/WD-Micropayment-Markup (9 Jun. 1999); "Distributing Intellectual Property: a Model of Microtransaction Based Upon Metadata and Digital Signatures", Olivia, Maurizio, http://olivia.modlang.denison.edu/~olivia/RFC/09/.

It is therefore an object of the invention to provide a system and method for authentication of a counterfeit-resistant document, comprising means for automatically describing an apparently non-deterministic characteristic of a recording medium of the document, means for receiving a document content of the counterfeit resistant document, means for storing the description of the apparently non-deterministic characteristic and document content in association with each other, and means for comparing the stored description of the apparently non-deterministic characteristic and document content with an observed apparently non-deterministic characteristic and document characteristic.

It is a further object of the invention to provide an authentication system comprising a plurality of media, each having a plurality of counterfeit-resistant non-deterministic elements, a detector, detecting the elements, a storage system for storing a description of the detected elements, a recording system for recording a content on the medium, means for storing the content, and means for comparing a set of detected elements and stored content with a set of observed elements of the media and content to authenticate the media and content. The elements may comprise, for example, a non-deterministic directional vector of a characteristic of a respective element. The elements may also be disposed in a non-deterministic spatial arrangement in the medium.

It is a further object of the invention to provide a system and method, for providing a counterfeit resistant document recording medium, having thereon a predefined unique document identifier and at least one security feature, defining a variable document content for imprinting on an identified recording medium, storing the variable document content in a database indexed by associated document identifier, and authenticating the counterfeit resistant document by authenticating the security feature and comparing the stored document content with a perceived document content. The step of authenticating the security feature preferably comprises execution of a cryptographic process. Further, the process includes accounting for storing and/or authenticating, for example, charging a financial account, or otherwise allocating cost and profit. The authenticating may, for example, be a self-authentication process performed without outside data access, or, for example, a local process for authenticating the security feature and a remote process for authenticating the document content. The remote process may be asynchronous with and delayed from the local process.

According to another embodiment of the invention, it is an object of the invention to provide a process is provided for authenticating a document comprising providing a document to be authenticated, having predefined document content, providing a serialized piece of paper currency, physically associating the document and the paper currency, storing document content in association with the serial number of the paper currency. Thus, the presumed authenticity of the currency (and intrinsic security features which underlie that presumption) is bootstrapped to authenticate the associated document. For example, the document is authenticated by recalling a database record including a serial number of a piece of physically associated paper currency and a document content, analyzing the paper currency for identity of serialization and authenticity, and comparing the recalled document content with a document content of the document to be authenticated.

Another object of the invention is to provide an authentication system comprising an authentication certificate having a counterfeit resistant element and a document content, a secure code associated with the authentication certificate defining an apparently non-deterministic characteristic of the counterfeit resistant element and a digital signature of the document content, an system for reading the apparently non-deterministic characteristic, and a processor for comparing the read apparently non-deterministic characteristic of the authentication certificate and content thereof with the associated secure code to determine an authenticity of the authentication certificate, the authenticity being associated with a reliability thereof, based on stochastic variations in the apparently non-deterministic characteristic, and stochastic variations in the received input used for generation of the associated secure code. The secure code is, for example, a public-key/private-key authentication code. The apparently non-deterministic characteristic may, for example, comprises one or more characteristics selected from the group consisting of: a pseudorandom imprint pattern, a non-deterministic pattern of elements comprising the media, an interaction of an aliquot of liquid dye with non-deterministic pattern of elements comprising the media media, and a non-deterministic pattern of an imprint on the medium.

The apparently non-deterministic characteristic may, for example, also comprise a deterministic characteristic which is hidden, i.e., a steganographic code. In this case, a sparse pattern generated by a pseudorandom code may be provided. This code may be imprinted separately from or together with the document content. In order to make the steganographic characteristic counterfeit resistant, it is preferably hidden in a feature of the medium. Thus, if a counterfeiter seeks to copy the counterfeit resistant document in sufficient detail to include the steganographic code, the copy will also include features intrinsic to the medium, resulting in a requirement for use of a corresponding medium which is, itself, absent any conflicting features, a requirement which may be made very difficult by selection of the stock. If the counterfeiter seeks to copy only the apparent document features, the steganographic code will be filtered, and thus absent from the copy. Thus, the apparently non-deterministic characteristic may be imprinted on the document in deterministic fashion. Alternately, the apparently non-deterministic characteristic may be truly non-deterministic, i.e., the result of random and irreproducible processes and effects, and for example, may be intrinsic to the medium substrate. Accordingly, a unique identifier of the document may comprise a serial number, and the apparently non-deterministic characteristic comprises a pseudorandom copy-resistant printed marking, wherein a secret algorithm defines a mapping between the serial number and a pattern of the pseudorandom copy-resistant printed marking. The authentication system may further comprise means for executing the secret algorithm and maintaining a security of the secret algorithm, and means for comparing an observed characteristic of a document to be authenticated to an output of the executing means.

According to one embodiment of the invention, a description of the apparently non-deterministic characteristic is imprinted as encrypted data on the document, allowing the medium to be self-authenticating. Therefore, it is possible to determine whether the medium is the same medium for which the encrypted data was originally defined. Further, a digital signature of the document content, which may be code ranging from a checksum of the digital data representing the document content to a complete representation of the document content may be provided on the document. Thus, a digital signature or digital notarization, in known manner, may be employed to authenticate the visible content of the document. Advantageously, the description of the apparently noon-deterministic characteristic of the media and the digital signature representing the document content are combined and encrypted together, so that neither is separable prior to decryption. The encryption preferably comprises a public key-private key algorithm.

Alternately or in addition to self-authentication features, the authentication may comprise a remote database access. In this case, the medium or document is uniquely identified, such as by a serial number. The document identification is then conveyed to the remote database, where the authentication data, including the description of the medium and description of document content is retrieved. According to one embodiment, the document content in the remote database is distinct from information imprinted on the document; since the remote server is presumed to be a trusted source, a direct communication between remote server and requested is considered reliable. In other cases, the remote database includes identical information or document content description information and supplemental information. For authentication, the document identifier may be manually entered by a person or automatically acquired, for example by an optical scanner, MICR reader, or the like.

It is another object of the invention to provide an infrastructure for generating authenticatable original documents, using relatively standard office equipment. In this case, preprocessed media are distributed through standard distribution channels for office supplies. This media is serialized and a description of apparently non-deterministic characteristics are recorded. The medium, which in this case is paper, for example 16–32 lb. stock, having a low contrast apparently non-deterministic pattern resulting from manufacturing processes, with the recorded description being either a description of a non-deterministic pattern, or a steganographic code hidden in the non-deterministic pattern of the media. The paper is loaded into a printer, with the serial numbers recorded and entered into a software application executing on a print server device, for example a print driver or print spooler associated with the printer. In the case of self-authenticating documents, for each document printed, the software application prints on the document an encrypted code describing the apparently non-deterministic features of the medium as well as a digital signature of the document content. Since this may occur at an operating system level, application programs need not be modified. The encrypted code may be generated in a number of ways. First, the document content and medium identifier may be transmitted to a remote server, for processing into a digital signature, hashed (irreversible process) with the description of the apparently non-deterministic features of the medium, and encrypted, using a public key-private key algorithm. Preferably, the data is compressed. In this case, the information may also be stored at the remote server for remote verification. Second, a description of the apparently non-deterministic features of the medium may be downloaded from a remote server or a local storage medium, such as a CD-ROM, and processed locally to generate the self-authentication signature. In order to provide system security, in this case, the description of the apparently non-deterministic features of the medium are preferably output from a secure encryption processor, for example having a decryption algorithm stored in volatile memory with memory purging in the event of tampering, which receives a document content and medium identifier, and outputs an encrypted hashed digital signature of the document content and description of the apparently non-deterministic features of the medium. This processor may be a server connecting to a computer network, a "dongle" device, or the like.

If the description of the apparently non-deterministic features of the medium is intrinsic to the identification of the medium, such as part of or resulting from the serialization, then it is possible to authenticate the medium and document content separately. Thus, a self-authenticating code may be preprinted on the medium. The document digital signature is processed to include the identification of the medium, for example the serial number. However, this has the potential flaw that if a counterfeiter comes into possession of blank media which he serializes with the desired number, and then applies an apparently authentic self-authentication algorithm, a casual authentication would not reveal the deception. Therefore, the self-authentication algorithm for the medium must be highly secure, i.e., very difficult to forge a self-authentication signature.

Thus, it is an object of the invention to provide print driver software, transmitting an identification of the recording medium and a description of the document content to a remote server upon printing of the document content on the medium.

It is also an object of the invention to provide print driver software, for transmitting an identifier of the recording medium to a remote server, receiving a description of the apparently non-deterministic characteristic from the remote server, and imprinting an encrypted message on the medium comprising a description of the apparently non-deterministic characteristic and the document content or a digital signature thereof.

It is a further object of the invention to provide, for authentication of document, an authentication device having an optical imaging system for automated description of the document, either the document content, the apparently non-deterministic features of the medium, or both. The automation provides two potential advantages; first, human effort is not necessary for describing the features, and second, a definition or identification of the particular features employed in authentication need not be published in human comprehensible form. Optical systems are advantageous because they are well developed, provide high precision, accuracy, and speed, and may be readily shielded from external influences. Of course, other types of authentication devices may be provided, for example magnetic, thermal, electronic or the like. Advantageously, the authentication features require between 600–2800 dpi resolution optical scanning with 10–16 bit dynamic range in one or more broadband or narrowband ranges. Preferably, a standard-type 600 dpi 36 bit color optical scanner is employed for authentication. Of course, as the minimum authentication feature size increases, the ability to foil counterfeiters also typically diminishes. A single optical scanner may be use for both reading the document content and observing the apparently non-deterministic features of the medium presented. Alternately, security dyes having predetermined spectrographic characteristics are employed, which are detected using a spectrographic (narrowband) optical scanner to match a predetermined spectral characteristic with an observed spectral characteristic for authentication. Thus, a single scanner or multiple scanner may be provided.

In a self-authentication embodiment, an authentication device is preferably self-contained, including one or more readers for the document digital signature, document content (if the digital signature is truncated), and medium authentication feature(s), decryption processor, and user interface. Preferably, the authentication device includes an internal accounting system and is tamper proof, to monitor usage of the device and prevent unauthorized analysis of embedded algorithms and security (cryptographic) codes.

Advantageously, the document content is provided in a word-processing file or page description language format, rather than as a bitmap, although either form may be acceptable.

It is also an object of the present invention to provide financial models and accounting systems for self authenticating documents which reflect alternate schemes for recouping investment and compensating a service provider. These include a charge per sheet of authentication medium, a charge per document creation, a charge for database lookup or retrieval, a flat fee for a type of usage, a variable charge depending on an encryption algorithm complexity, a charge for authentication services, a selective charge for authentication failures, e.g., instances of possible counterfeiting, a recurring fee for on-line data storage, and/or a combination or subcombination thereof.

The present invention also means for comparing at least two descriptions of apparently non-deterministic characteristics of the same medium having differing degrees of complexity. Thus, "simple" and "complex" authentication modes are supported. Each of these modes may be separately accounted; thus, the cost for obtaining a decryption key for the simple authentication maybe less than the complex decryption.

According to one embodiment of the invention, the apparently non-deterministic characteristic comprises at least one region having a magnetic property. For example, if magnetic toner particles, e.g., ferrite-containing, are included at low density randomly distributed through a laser printer toner cartridge, the resulting print will have a non-deterministic pattern of magnetic particles. It would be quite difficult to selectively place magnetic particles in the exact locations necessary to forge authenticity.

In authenticating a document, it is preferred that the decision of authenticity be made in a probabilistic manner, rather than a concrete manner. Authentication may therefore be provided with a decision, as well as an associated statistical reliability. Further, one embodiment provides an adaptive threshold, based, for example, on the circumstances of presentment, value of the document, noise or interfering factors, required throughput, correlations of sets of authentication features, and/or other factors. Fuzzy logic or neural networks may be employed for authentication.

According to one embodiment of the invention, a transform is applied to a scanned image of the document and a comparison of the stored data and observed characteristics of the document performed in a transformed domain or in a normalized space. The transform is, for example, a rotationally invariant two dimensional transform. The transform may thus normalize for a characteristic selected from the group consisting of rotation, skew, stretch, and fade.

It is a further object of the invention to provide a plaintext decryption key imprinted on a secure document, the document content being stored remotely, further comprising means for transmitting in encrypted form the description of the apparently non-deterministic characteristic and document content, for decryption by the decryption key.

It is another object of the invention to provide a method of authenticating a document, comprising providing a document stock having anti-counterfeit features; preprinting the document with an essentially unique identifier; defining a content for the document having an associated digital signature for verification of the document content and essentially unique identifier; and printing the content and digital signature on the document stock. The method preferably further comprises the step of authenticating the document by verifying that the digital signature corresponds to the document content and essentially unique identifier.

The anticounterfeit features preferably comprise a set of visually distinct fibers in said document stock and/or a lithographed pattern printed on said document stock. The essentially unique identifier preferably comprises a composite of a random portion and a serialized portion.

The method also preferably comprises the step of accounting to a content proprietor for a printing of the document. The accounting step preferably comprises issuing a request for the content and electronic payment information; and receiving content and associated digital signature.

The printing may be through a secure or unsecure communications channel. This security relates to whether the page image or other information received by the printer is transmitted in the clear, or is subjected to cryptographic techniques such that no easily interceptable electronic signal (e.g., through an external cable) defining the printed page exists.

According to another embodiment of the invention, a stochastic characteristic integral with the recording media is analyzed to provide an encryption key necessary for an authentication process. Thus, the non-deterministic characteristic is itself employed to encrypt a message, which is then decrypted using the same key, which is intrinsic to the media, and difficult to copy. This may be a symmetric algorithm or public key-private key algorithm. In this embodiment, the authentication may be self-authentication or involve a trusted party. In the later case, a unique identifier of the document is transmitted to a remote processor, a representation of the document content encrypted using a public key-private key algorithm and information defining an appropriate public key is transmitted to a local cryptographic processor, wherein the local cryptographic processor decrypts the document based on the encrypted document content, public key and private key.

The medium may be subdivided into a plurality of regions, each having its own authentication code. Thus, during initial medium preprocessing and identification, it may be completely analyzed for all regions. However, during authentication, a random subset of the regions may be selected for analysis. Thus, while the authentication process may be substantially simplified, a counterfeiter would be required to reproduce the entire medium, not knowing which region will be randomly selected, in order to avoid substantial risk of detection. The characteristics of each region may be thus defined and encrypted separately.

These and other objects will become apparent. For a fuller understanding of the present invention, reference should now be made to the following detailed description of the preferred embodiments of the invention as illustrated in the accompanying drawings.

BRIEF DESCRIPTION OF THE DRAWINGS

The invention will now be described with respect to the drawings of the Figures, in which like numbers designate like parts, and in which:

FIG. 1 is a top view of a self-authenticating document according to the present invention;

FIG. 2 is a top view of an authenticatable document according to the present invention;

FIG. 3 is a schematic view of a document preprocessing system according to the present invention;

DETAILED DESCRIPTION OF THE PREFERRED EMBODIMENTS

Figure 4:
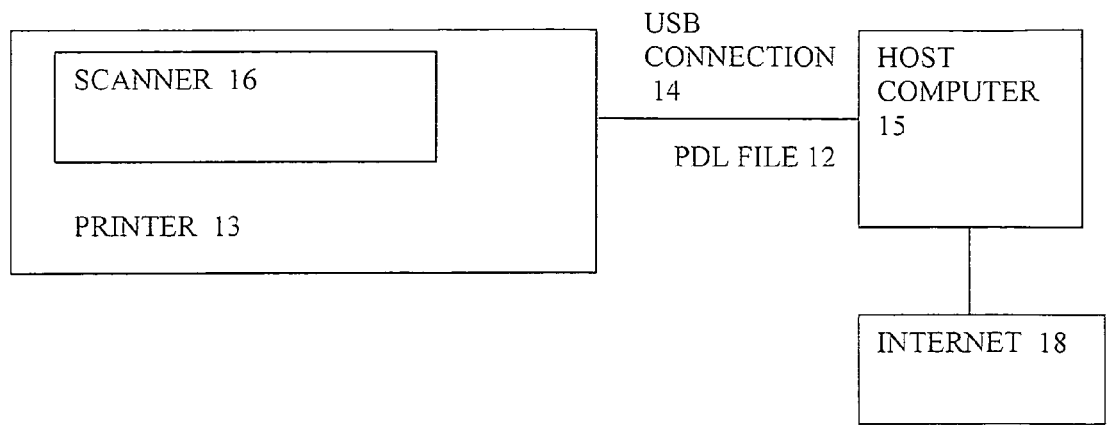
FIG. 4 is a schematic view of a document content printing system according to the present invention.

The detailed preferred embodiments of the invention will now be described with respect to the drawings. Like features of the drawings are indicated with the same reference numerals.

Example 1

In order to form counterfeit-resistant document stock, fluorescent dichroic fibers may be incorporated into papermaking processes, as fibers within the pulp matrix of a papermaking process. The fiber position and orientation will, in this case, be strictly non-deterministic, and further, copying fiber locations and orientations will be essentially impossible. The degrees of freedom for these fibers include the fiber position, orientation, depth of fiber within fiber matrix, dichroic ratio, color and/or spectrometric characteristics, fiber microenvironment, etc.

The fluorescent dichroic fibers can be used to provide several levels of increasing authentication/counterfeiting-detection. The presence of fibers and their dichroism, the position and orientation of fibers, the depth and environment of fibers, the spectral characteristics of individual fibers, spatial variation of characteristics within a single fiber, etc.

As shown in FIG. 1, a self-authenticating document is provided having a stock 1, printed document content 2, authentication region 3, and encrypted encoding region 4.

FIG. 2 differs from FIG. 1 in that the encrypted encoding region 4 of FIG. 1 is replaced or supplemented with a document identifier 5, which be a serial number or the like.

Figure 6A:
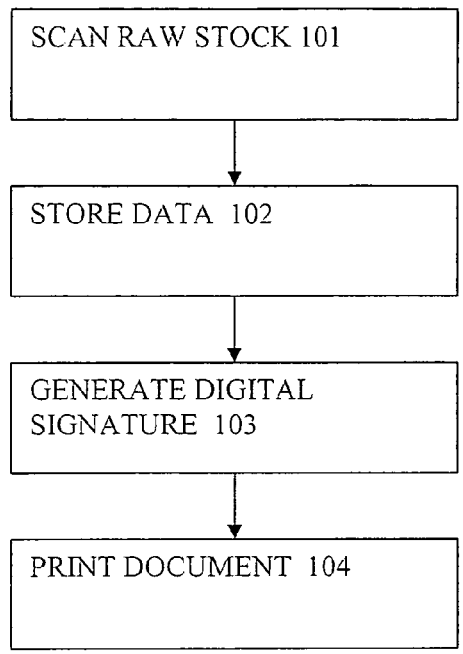
FIGS. 6A and 6B are flow diagrams, respectively, of a method of generating and authenticating a document, respectively.

FIG. 3 shows a schematic diagram of a document preprocessing system, and FIG. 6A the corresponding method. Raw stock 1 is scanned 101 by scanner 10 to determine a non-deterministic pattern of fibers 6 within the authentication region 3. This data is then stored 102, for example in temporary memory 11 under control of a host computer 15, or in association with an identifier of the stock 1.

In the case of a self-authenticating document, as shown in FIG. 1, the data is then hashed with a digital signature of the document content 103, defined by a page description language file 12, encrypted, and printed 104 on the face (or obverse) of the document in the encrypted coding region 4.

Alternately, the scanning operation may be performed prior to stock distribution, with each piece of stock having an imprinted document identifier 5. The database of document identifiers 5 and scanned images may then be maintained locally to a printer 13 or remotely. If stored remotely, a print driver application may access the file in real time through an Internet 18 or other network access connection. Instead of the scanner 16, a simple reader 17 may be provided for reading the document identifier 5, which may be a bar code, MICR imprint, or the like.

FIG. 4 shows a schematic drawings of a document printer according to the present invention. Advantageously, the scanner 16 is provided as a part of a paper tray for a printer 13, with a universal serial bus (USB) connection 14 to a host computer 15, or communicating through a printer interface or print server interface. Immediately prior to printing, the fibers within the authentication region 3 are scanned with scanner 16, and the data transmitted to the host computer 15. A print driver application executing on the host computer 15 processes the scanned image, with a page description language (PDL) file 12 received for printing on the printer 13. The print driver application hashes and encrypts the scanned image (or descriptors thereof) with the PDL file 12 or a digital signature thereof, to generate a two-dimensional bar code or glyph for printing within the encrypted encoding region 4, which is used to generate a modified PDL file. In this case, an authentication code identifying the authorized producer of the document and tracking information, is preferably encoded as well.

Figure 5:
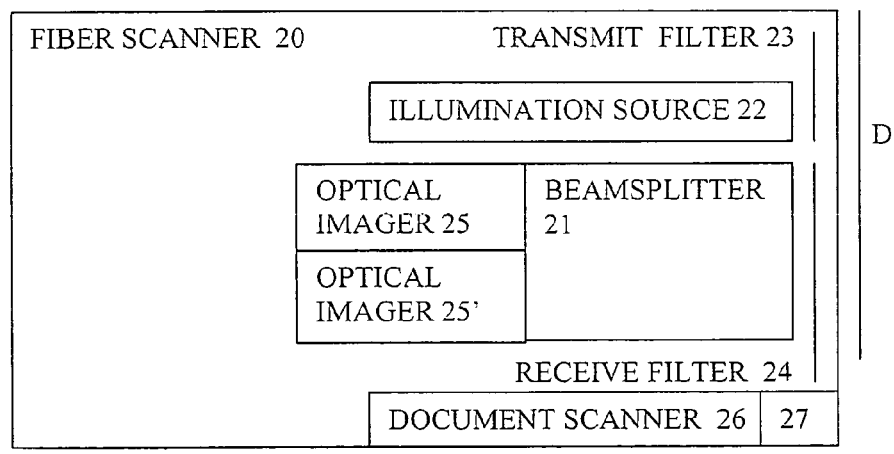
FIG. 5 is a schematic view of a document authentication system according to the present invention.

In order to authenticate a document, an apparatus as shown in FIG. 5 is provided. This device includes a fiber scanner 20, having a polarization-sensitive beamsplitter 21 (such as a calcite crystal), illumination source 22 (such as a krypton incandescent lamp), transmit filter 23 (e.g., Ratten high pass for excitation of fluorescence), receive filter 24 (narrowband for passing fluorescence), and a pair of optical imagers 25, 25' (for respective polarization axes) (1.0" 1024 pixel CCD line scanner). The device also includes document scanner 26 having a 200–400 dpi monochrome line scanner 27, much as is found in a standard facsimile machine.

Figure 6B:
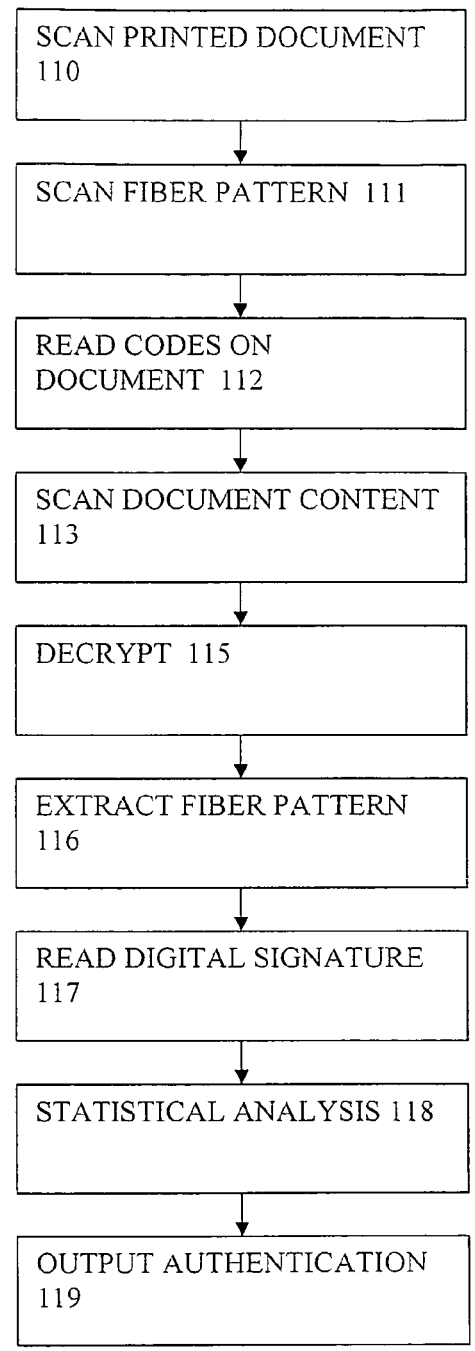

During use, as shown in FIG. 6B, a document to be authenticated is scanned by all three scanners, in a single pass 110. The fiber scanner 20 acquires an image of the fiber pattern 111, as well as the 2D bar code or glyphs 112. The document scanner 26 acquires an image of the document content 113. A processor 30 then applies a decryption algorithm 115 to the acquired code, and compares the extracted fiber pattern to the observed fiber pattern 116, and the digital signature of the document content to the observed document content 117. The comparison is then subjected to a statistical analysis 118 to determine authenticity. Finally, an authentication is output 119.

The processor 30 may be local to the scanner and self contained, as in a self-authentication embodiment, or distributed or remote in a remote authentication embodiment. The encryption algorithm in a self-authentication embodiment is, for example, a public key-private key algorithm.

Example 2

According to a second embodiment, a recording medium stock is provided having at least one anticounterfeit feature, similar to the new U.S. currency ($20, $50, And $100 Federal Reserve Notes). In a later stage of production, a readily ascertainable essentially unique identifier is imprinted on the document. In contrast to currency, this identifier is preferably not a serial number, but rather a composite of a serialized portion and a random portion. By providing a composite, two ends are achieved; the random portion makes determining any valid identifier difficult, while the serial portion ensures that each composite is a unique identification. Together, the identifier has greater length, often an advantage when the identifier is a part of a message encrypted with a long encryption key.

The recording medium may also have imprinted thereon a set of colored dots in unpredictable locations, with the number and location of the dots recorded.

Associated with the imprinting of the identifier, a self-authenticating message is defined, including the identifier, using a public key-private key encryption method. The key pair may be selected on a per document or random basis, per ream (range of recording medium), per pre-identified client (i.e., content owner), or in other manner, and is used to generate a cipher-text message, which is stored in association with the identifier of the recording medium. A message is then recorded on the recorded medium including the document identifier (serial number and randomly-generated password), and optionally, the public key.

The private key is maintained in secrecy at the point of origin, and indeed need not be communicated in any way.

At a later time, a user defines the desired document content and communicates this to the service provider, for example a gift certificate or theatre ticket, as well as the unique identifier of a piece of recording medium which was obtained through, for example, a retail channel. An accounting transaction takes place to account for the value of the content. This accounting is, for example, a three party transaction, with the user paying the service provider, and the service provider accepting a commission and compensating the content owner.

The content is then authorized for imprinting, and a message transmitted to the user from the service provider including an image of the document content, optionally including a copy of the unique identifier, optionally a dot pattern corresponding to the color dots on the recording medium, optionally the public key previously defined for the recording medium, optionally a digital signature for the document content and the unique identifier, and optionally a second randomly generated password. This digital signature and an explicit or implicit identification of the associated public key are required for self-authentication. The optional second password provides high security for on-line authentication.

Thus, a first level of authentication provides that the recording medium appears to be authentic, the preprinted identifier matches the identifier printer with the content, and the color dots are covered. A second level of authentication provides that the cipher-text message, decrypted with the public key, matches the document identifier and the document content corresponds to the digital signature.

A machine-readable glyph pattern or 2-D bar code may be defined as part of the document content image. A document scanner at the point of authentication, for example a 200 dpi scanner (similar to the ITU telefacsimile standard) may be used, and indeed the authentication may be embedded in a facsimile machine. In case the document is consumed at the point of authentication, the original may be truncated, for example by shredding or marking with a "VOID" indication. A record of each authentication is preferably maintained for deferred transmission to the central server, and possible accounting.

There has thus been shown and described novel anticounterfeit documents, and associated apparatus and methods, which fulfill all the objects and advantages sought therefore. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of producing a self-authenticating document, comprising:
   providing a document stock having at least one anti-counterfeit feature and having preprinted thereon an essentially unique identifier;
   providing information content for the document comprising at least one of text and graphic images;
   generating a digital signature of said information content;
   producing a self-authenticating message comprising a cryptographic combination of the digital signature and the essentially unique identifier; and
   printing the information content and the self-authenticating message on the document stock by means of a computer printer.

2. The method according to claim 1, further comprising the step of authenticating the document by verifying that the self-authenticating message corresponds to the digital signature of the information content and the essentially unique identifier.

3. The method according to claim 1, further comprising the step of receiving the information content and the self-authenticating message.

4. The method according to claim 1, wherein the anti-counterfeit feature comprises a set of visually distinct fibers in said document stock.

5. The method according to claim 1, wherein the essentially unique identifier comprises a composite of a random portion and a predictable portion.

6. The method according to claim 1, further comprising the step of accounting to a content proprietor for a printing of the document.

7. The method according to claim 6, wherein said accounting comprises issuing a request for the document content and electronic payment information; and receiving content and its associated digital signature.

8. The method according to claim 1, wherein said preprinting step comprises printing with a computer printer using a non-secure communications channel.

9. The method according to claim 1, wherein said printing step comprises printing with said computer printer using a non-secure communications channel.

10. The method according to claim 1, wherein said printing step comprises communicating the essentially unique identifier over a network to a server, receiving the document content over the network from the server, and printing the received content on the document stock.

11. The method according to claim 1, wherein said providing and preprinting steps are conducted securely.

12. The method according to claim 1, wherein the anti-counterfeit features comprise at least one of a lithographed pattern printed on the document stock and an integral non-deterministic characteristic of the document stock.

13. The method according to claim 12, wherein the non-deterministic characteristic comprises a fiber pattern, further comprising the steps of recording the fiber pattern prior to said printing, and authenticating the document stock by comparing a consistency of the recorded fiber pattern with a fiber pattern determined at a time of authentication.

14. The method according to claim 1, further comprising the step of authenticating the document based on a public key-private key algorithm which authenticates the essentially unique identifier together with the document content.

15. An authenticatable recording medium, comprising:
   a document stock having at least one counterfeit resistant feature;
   an imprinted unique identifier on the document stock;
   an information content recording surface with a blank area suitable for printing at least one of text and graphic images by means of a computer printer and a blank area for printing a self-authenticating message;
   information content recorded on the content recording surface, said information content defining a distinct identification element; and
   a self-authenticating message recorded on the content recording surface for authenticating the recording medium with the information content and the unique identifier, said message comprising a cryptographic combination of the unique identifier and the distinct identification element.

16. The authenticatable recording medium according to claim 15, further comprising an ascertainable integral non-deterministic characteristic of the document stock.

17. The authenticatable recording medium according to claim 16, wherein the non-deterministic characteristic comprises a fiber pattern.

18. The authenticatable recording medium according to claim 15, wherein the imprinted tamper resistant unique identifier comprises a predictable portion and a random portion.

* * * * *